(12) United States Patent
Kondo et al.

(10) Patent No.: US 7,477,305 B2
(45) Date of Patent: Jan. 13, 2009

(54) IMAGING DEVICE AND IMAGING METHOD

(75) Inventors: Tetsujiro Kondo, Tokyo (JP); Kazutaka Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 793 days.

(21) Appl. No.: 10/009,760

(22) PCT Filed: Apr. 13, 2001

(86) PCT No.: PCT/JP01/03203

§ 371 (c)(1),
(2), (4) Date: Jan. 13, 2003

(87) PCT Pub. No.: WO01/80551

PCT Pub. Date: Oct. 25, 2001

(65) Prior Publication Data

US 2003/0174234 A1 Sep. 18, 2003

(30) Foreign Application Priority Data

| Apr. 13, 2000 | (JP) | ............................ 2000-112345 |
| Apr. 4, 2001 | (JP) | ............................ 2001-105852 |

(51) Int. Cl.
*H04N 5/335* (2006.01)
(52) U.S. Cl. .................................................. 348/297
(58) Field of Classification Search ................. 348/296, 348/297
See application file for complete search history.

(56) References Cited

U.S. PATENT DOCUMENTS

| 5,418,546 | A | * | 5/1995 | Nakagakiuchi et al. ........ 345/85 |
| 5,517,242 | A | * | 5/1996 | Yamada et al. .............. 348/254 |
| 2001/0030708 | A1 | * | 10/2001 | Ide et al. ..................... 348/362 |

FOREIGN PATENT DOCUMENTS

| JP | 63-306777 | | 12/1988 |
| JP | 04313949 A | * | 11/1992 |
| JP | 8-125924 | | 5/1996 |
| JP | 11-98409 | | 4/1999 |
| JP | 2000-32303 | | 1/2000 |

* cited by examiner

*Primary Examiner*—Tuan Ho
*Assistant Examiner*—Dillon Durnford-Geszvain
(74) *Attorney, Agent, or Firm*—Frommer Lawrence & Haug LLP; William S. Frommer; Thomas F. Presson

(57) ABSTRACT

At a controller 5, pixel values that a CCD 3 outputs are evaluated. On the basis of the evaluation result, exposure times with respect to a light receiving surface of the CCD 3 in a shutter 2 constituted with, e.g., DMD (Digital Micromirror Device), etc. are set in pixel units. Further, image pick-up of object is carried out by exposure times set in pixel units in that way. As a result, even in the case of object of high contrast, picture image of which detail is not injured can be obtained.

8 Claims, 19 Drawing Sheets

FIG.8A

| ADDRESS | EXPOSURE TIME |
|---|---|
| ... | ... |
| n-1 | 1/100 |
| n | 1/100 |
| n+1 | 1/100 |
| ... | ... |

| PIXEL VALUE | EXPOSURE TIME |
|---|---|
| ... | ... |
| 210 | 1/100 |
| 240 | 1/100 |
| 250 | 1/100 |
| ... | ... |

| ADDRESS | EXPOSURE TIME |
|---|---|
| ... | ... |
| n-1 | 1/100 |
| n | 1/100 |
| n+1 | 1/120 |
| ... | ... |

25

IMAGING DEVICE AND IMAGING METHOD

TECHNICAL FIELD

This invention relates to an image pick-up apparatus and an image pick-up method, a program and a program recording medium, a data structure and a data recording medium, and an image pick-up control apparatus, and more particularly to an image pick-up apparatus and an image pick-up method, a program and a program recording medium, a data structure and a data recording medium and an image pick-up control apparatus adapted so as to have ability to obtain picture image of object of high contrast without losing its detail, e.g., in digital video camera, etc.

BACKGROUND ART

For example, in digital video cameras, light from object is converged by lens onto the light receiving surface of photo-electric conversion device such as CCD (Charge Coupled Device), etc., at which photo-electric conversion is carried out so that picture data which is electric signal is provided.

In digital video cameras, light from lens is incident upon CCD through shutter which controls exposure. Accordingly, when shutter speed is low, i.e., exposure time is long, many electric charges are charged in CCD, resulting in the so-called over exposure. Further, picture image obtained at the time of over exposure results in the so-called white overexposure picture image. On the other hand, when exposure time is short, quantity of electric charges charged in CCD becomes lesser. As a result, the so-called under exposure takes place, and picture image obtained results in black underexposure picture image. In order to prevent such white overexposure or black underexposure, it is necessary to set exposure time so that the area from the portion where picture image is the most bright up to the portion where it is the most dark has suitable brightness.

Meanwhile, in conventional digital video cameras, photo-graphing is carried out at the same exposure time with respect to the entirety of the light receiving surface of CCD. Accordingly, in the case where object of high contrast is photographed (imaged), the bright portion results in white overexposure portion, or the dark portion results in black underexposure portion, resulting in the problem that detail of object is lost in the picture image thus obtained.

It is to be noted that while camera with liquid crystal shutter is disclosed in, e.g., the Japanese Patent Application No. 28796/1994, this camera cannot control exposure in pixel units of CCD, but can only set the same exposure time with respect to the entirety of the light receiving surface of CCD.

DISCLOSURE OF THE INVENTION

This invention has been made in view of such circumstances and an object of this invention is to provide an image pick-up apparatus, an image pick-up method, a program, a program recording medium, a data structure, a data recording medium, and an image pick-up control apparatus which can pick image of up even object of high contrast without losing its detail.

An image pick-up apparatus according to this invention comprises image pick-up means having a light receiving surface for receiving light from object to carry out photo-electric conversion and adapted to output pixel value obtained as the result of the photo-electric conversion, evaluating means for evaluating pixel value, and control means for controlling, in pixel units, exposure time with respect to the light receiving surface on the basis of evaluation result by the evaluation means.

An image pick-up method according to this invention includes an evaluation step of evaluating pixel value acquired from an image pick-up unit having a light receiving surface for receiving light from object to carry out photo-electric conversion and adapted to output pixel value obtained as the result of the photo-electric conversion, and a control step of controlling, in pixel units, exposure time with respect to the light receiving surface on the basis of evaluation result by the evaluation step.

A program according to this invention includes an evaluation step of evaluating pixel value acquired from an image pick-up unit having a light receiving surface for receiving light from object to carry out photo-electric conversion and adapted to output pixel value obtained as the result of the photo-electric conversion, and a control step of controlling, in pixel units, exposure time with respect to the light receiving surface on the basis of evaluation result by the evaluation step.

A program recording medium according to this invention is adapted so that there is recorded a program including an evaluation step of evaluating pixel value acquired from an image pick-up unit having a light receiving surface for receiving light from object to carry out photo-electric conversion and adapted to output pixel value obtained as the result of the photo-electric conversion, and a control step of controlling, in pixel units, exposure time with respect to the light receiving surface on the basis of evaluation result by the evaluation step.

A data structure according to this invention is adapted so that plural pixel values that an image pick-up unit for picking up image of object outputs and exposure times every pixel values used in the image pick-up unit in order to obtain respective plural pixel values are caused to correspond to each other.

A data recording medium according to this invention is adapted so that plural pixel values that an image pick-up unit for picking up image of object outputs and exposure times every respective pixels used in the image pick-up unit in order to obtain respective plural pixel values are recorded in such a manner that they caused to correspond to each other.

An image pick-up control apparatus according to this invention comprises an evaluating unit for evaluating pixel value, and control means for outputting, to an image pick-up unit, a control signal for controlling, in predetermined surface units, exposure time with respect to a light receiving surface on the basis of evaluation result by the evaluating unit.

An image pick-up apparatus according to this invention comprises image pick-up means having a light receiving surface for receiving light from object to carry out photo-electric conversion and adapted to output pixel value obtained as the result of the photo-electric conversion, control means for controlling plural exposure times with respect to the light receiving surface, and selector means for selecting one pixel value from pixel values corresponding to respective plural exposure times of the respective pixel positions which are obtained by picking up image of object by plural exposure times on the basis of control of the control means in the image pick-up means.

An image pick-up method according to this invention includes a control step of controlling plural exposure times with respect to a light receiving surface at an image pick-up unit having the light receiving surface for receiving light from object to carry out photo-electric conversion and adapted to output pixel value obtained as the results of the photo-electric conversion, and a selection step of selecting one pixel value from pixel values corresponding to respective plural exposure times of respective pixel positions which are obtained by picking up image of object by plural exposure times on the basis of control at the control step in the image pick-up unit.

A program according to this invention includes an evaluation step of evaluating pixel values corresponding to respective plural exposure times of respective pixel positions which are obtained by controlling plural exposure times with respect to a light receiving surface at an image pick-up unit having the light receiving surface for receiving light from object to carry out photo-electric conversion and adapted to output pixel value obtained as the result of the photo-electric conversion, and a selection step of selecting one pixel value from pixel values corresponding to respective plural exposure times on the basis of evaluation result by the evaluation step.

A program recording medium according to this invention is adapted so that there is recorded a program including an evaluation step of evaluating pixel values corresponding to respective plural exposure times of respective pixel positions which are obtained by controlling plural exposure times with respect to a light receiving surface at an image pick-up unit having the light receiving surface for receiving light from object to carry out photo-electric conversion and adapted to output pixel value obtained as the result of the photo-electric conversion, and a selection step of selecting one pixel value from pixel values corresponding to respective plural exposure times on the basis of evaluation result by the evaluation step.

In this invention, pixel value acquired from image pick-up means having a light receiving surface for receiving light from object to carry out photo-electric conversion and adapted to output pixel value obtained as the result of the photo-electric conversion is evaluated, and exposure time with respect to the light receiving surface is controlled in pixel units on the basis of the evaluation result.

Moreover, in this invention, plural pixel values that an image pick-up apparatus (unit) for picking up image of object outputs and exposure times every respective pixels used in the image pick-up unit in order to obtain respective plural pixel values are caused to correspond to each other.

Further, in this invention, pixel value is evaluated, and a control signal for controlling, in predetermined surface units, exposure time with respect to the light receiving surface on the basis of its evaluation result is outputted to the image pick-up unit.

Further, in this invention, plural exposure times with respect to the light receiving surface in image pick-up means having light receiving surface for receiving light from object and adapted to output pixel value obtained as the result of the photo-electric conversion are controlled, and one pixel value is selected from pixel values corresponding to respective plural exposure times of respective pixel positions which are obtained by picking up image of object by plural exposure times on the basis of the control.

In addition, in this invention, pixel values corresponding to respective plural exposure times of respective pixel positions which are obtained by controlling plural exposure times with respect to light receiving surface at image pick-up unit having the light receiving surface for receiving light from object to carry out photo-electric conversion and adapted to output pixel value obtained as the result of the photo-electric conversion are evaluated, and one pixel value is selected from pixel values corresponding to respective plural exposure times on the basis of the evaluation result.

BRIEF DESCRIPTION OF THE DRAWINGS

FIGS. 8A, 8B, 8C are views showing storage contents of memories 6 and 25.

BEST MODE FOR CARRYING OUT THE INVENTION

Figure 1:
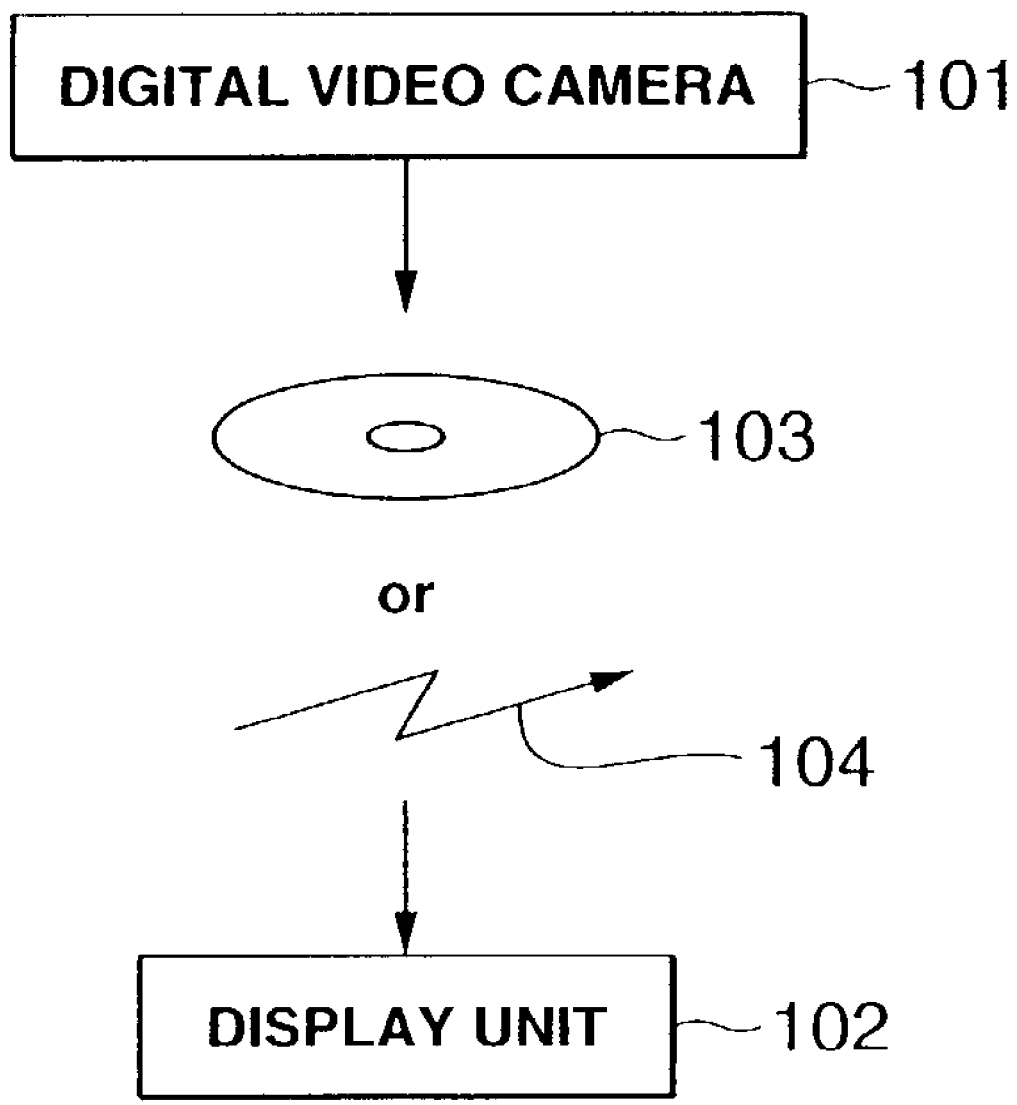
FIG. 1 is a block diagram showing an example of configuration of a digital video camera system to which this invention is applied.

FIG. 1 shows an example of the configuration of an embodiment of a digital video camera system to which this invention is applied. A digital video camera 101 picks up image of a predetermined object to output picture information including picture data. This picture information is recorded with respect to a recording medium 103 comprised of, e.g., semiconductor memory, magneto-optical disc, magnetic disc, optical disc, magnetic tape or phase change disc, etc., or is caused to undergo transmission through a transmission medium 104 comprised of, e.g., ground wave wireless circuit, satellite circuit, CATV (Cable Television) network, internet, public circuit, or bus, etc., and is offered to a display unit 102. The display unit 102 receives picture information provided through the recording medium 103 or the transmission medium 104 to display corresponding picture image on the basis of the received picture information. It is to be noted that the digital video camera 101, the display unit 102 and the recording medium 103 or the transmission medium 104 may be constituted as a single apparatus.

Figure 2:
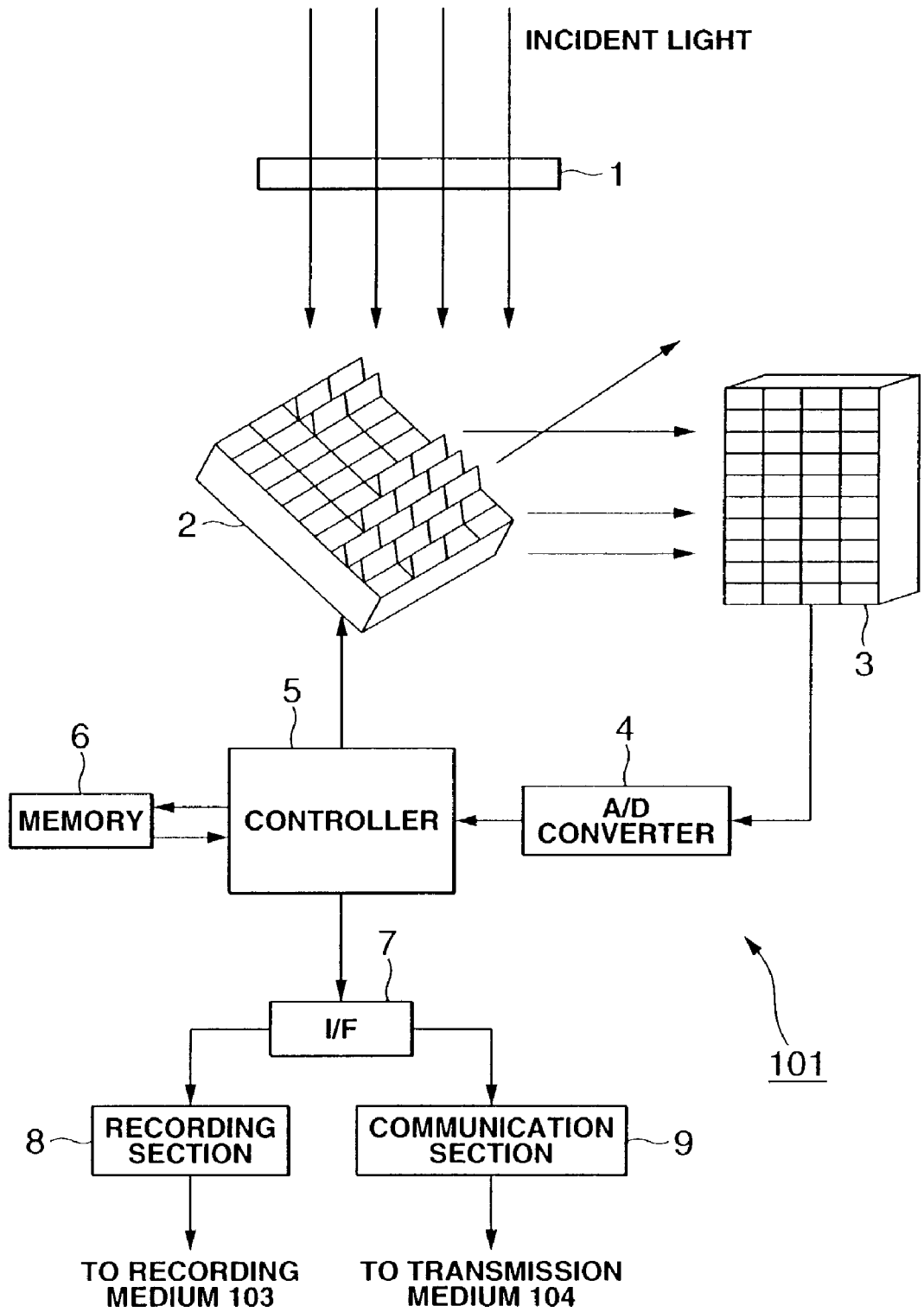
FIG. 2 is a view showing an example of configuration of a first embodiment of digital video camera 101 to which this invention is applied.

FIG. 2 shows an example of the configuration of the first embodiment of the digital video camera 101 of FIG. 1. Light from object is incident upon a lens 1, and the lens 1 converges that light onto the light receiving surface of a CCD 3 through a shutter 2.

The shutter 2 is controlled by a controller 5, and serves to reflect light from the lens 1, e.g., in pixel units constituting the light receiving surface of the CCD 3 to thereby control exposures with respect to respective pixels of the CCD 3. Namely, in FIG. 2, the shutter 2 is constituted with, e.g., DMD (Digital Micromirror Device) in which a large number of very small reflection mirrors are formed on semiconductor substrate, and respective mirrors are rotated in accordance with control from the controller 5 so that reflection direction of light incident thereupon can be changed in those mirror units.

In this example, respective mirrors constituting DMD correspond to respective pixels constituting the CCD 3. Accordingly, the respective mirrors are rotated to thereby change reflection direction of light from the respective mirrors to the respective pixels of CCD 3 so that incidence of light upon corresponding pixels can be turned ON/OFF. It is to be noted that DMD is disclosed in, e.g., the Japanese Patent Application No. 73952/1995 (Priority No. US221739, Priority Date: Mar. 31, 1994).

The CCD 3 receives light from the shutter 2 in respective pixels constituting that light receiving surface to thereby charge electric charges corresponding to that light quantity. Further, the CCD 3 carries out the so-called bucket brigade of electric charges charged in respective pixels (electric charges integrated by integral effect) to output electric signal of corresponding voltage level to an A/D (Analog/Digital) converter 4. While CCD is used as photo-electric conversion device for receiving light from the shutter 2 to carry out photo-electric conversion in this example, BBD (Bucket Brigade Device), etc. may be used in addition to CCD.

The A/D converter 4 carries out sampling of electric signal from the CCD 3 at timing corresponding to pixels to quantize it to thereby deliver pixel values of respective pixels constituting digital picture data to the controller 5. In this example, the A/D converter 4 is assumed to output, e.g., pixel value of 8 bits.

The controller 5 evaluates pixel values of respective pixels delivered through the A/D converter 4 from the CCD 3. Further, the controller 5 sets, in respective pixel units, exposure time by shutter 2 on the basis of the evaluation result to control the shutter 2. Further, the controller 5 corrects, as occasion demands, pixel values of respective pixels delivered through the A/D converter 4 from the CCD 3 on the basis of exposure time set when those pixel values are obtained to output, as picture information, picture data of, e.g., 1 frame (or 1 field) units consisting of corrected pixel values. In addition, the controller 5 outputs, as picture information, pixel value and exposure time set when corresponding pixel value is obtained. Picture information that the controller 5 outputs are received by an I/F (Interface) 7.

A memory 6 temporarily stores data necessary for processing of the controller 5. The I/F 7 delivers picture information from the controller 5 to a recording section 8 or a communication section 9 in accordance with, e.g., instruction from user, etc. The recording section 8 records picture information from the I/F 7 onto a recording medium 103. The communication section 9 transmits picture information from the I/F 7 through a transmission medium 104.

Figure 3:
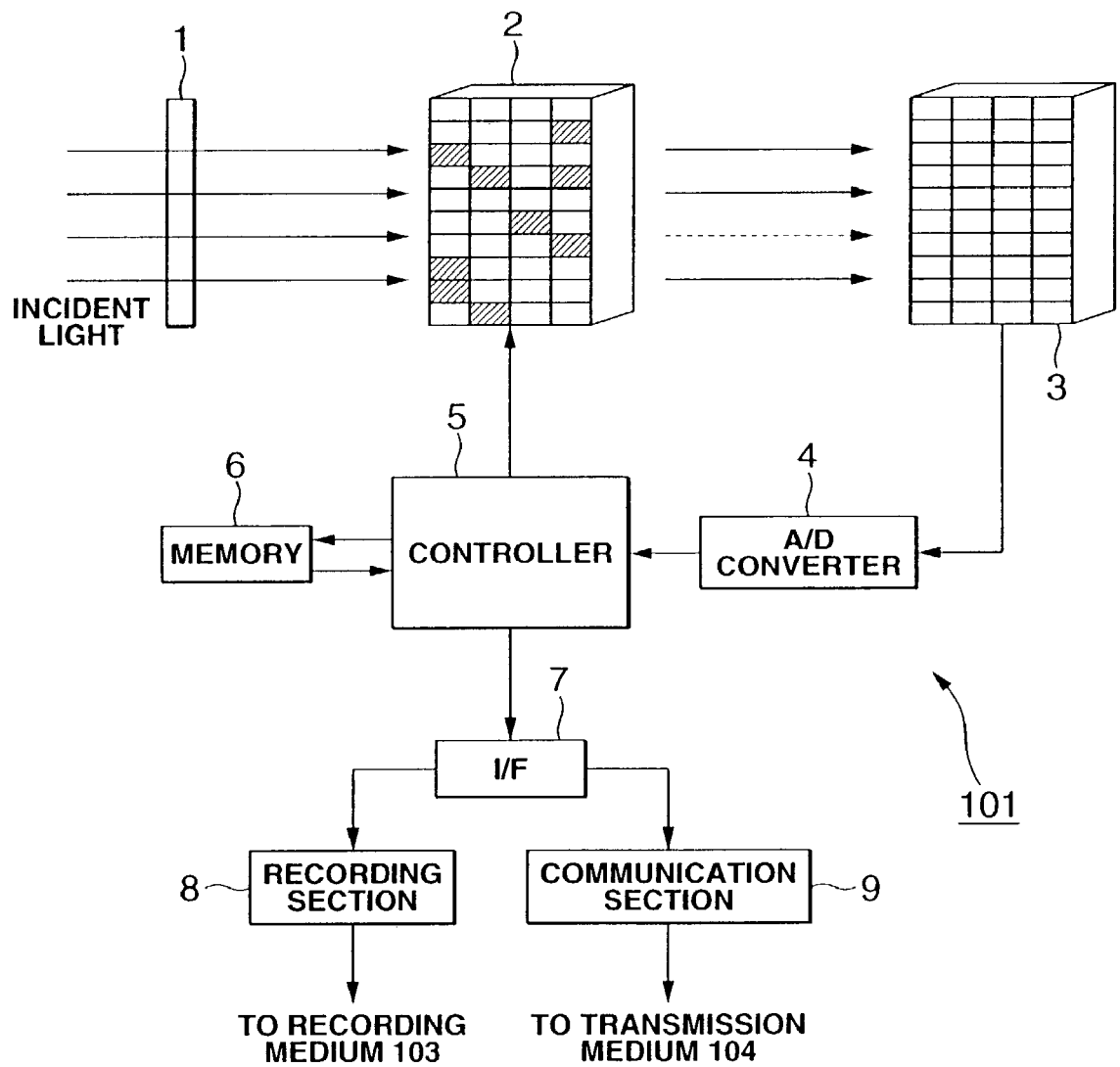
FIG. 3 is a block diagram showing an example of configuration of a second embodiment of digital video camera 101 to which this invention is applied.

FIG. 3 shows an example of configuration of a second embodiment of the digital video camera 101 of FIG. 1. It is to be noted that the same reference numerals are respectively attached to portions corresponding to the case in FIG. 2 in the figure and its explanation will be omitted as occasion demands.

Namely, the digital video camera 101 of FIG. 3 is constituted essentially similarly to the digital video camera 101 of FIG. 2. In FIG. 3, the shutter 2 is constituted with liquid crystal panel (liquid crystal shutter).

The shutter 2 constituted with the liquid crystal panel is controlled by the controller 5 to allow light from the lens 1 to be transmitted in pixel units constituting, e.g., light receiving surface of the CCD 3 to thereby control exposures with respect to respective pixels of the CCD 3.

Namely, in FIG. 3, direction of liquid crystal molecules constituting liquid crystal panel as the shutter 2 is changed in units corresponding to pixel in accordance with control of the controller 5 so that transmission of light in that unit is limited. Thus, incidence of light upon corresponding pixel can be turned ON/OFF. While the liquid crystal panel of the transmission type is used as the shutter 2 in this example, liquid crystal panel of the reflection type may be used in addition to the above.

Figure 4:
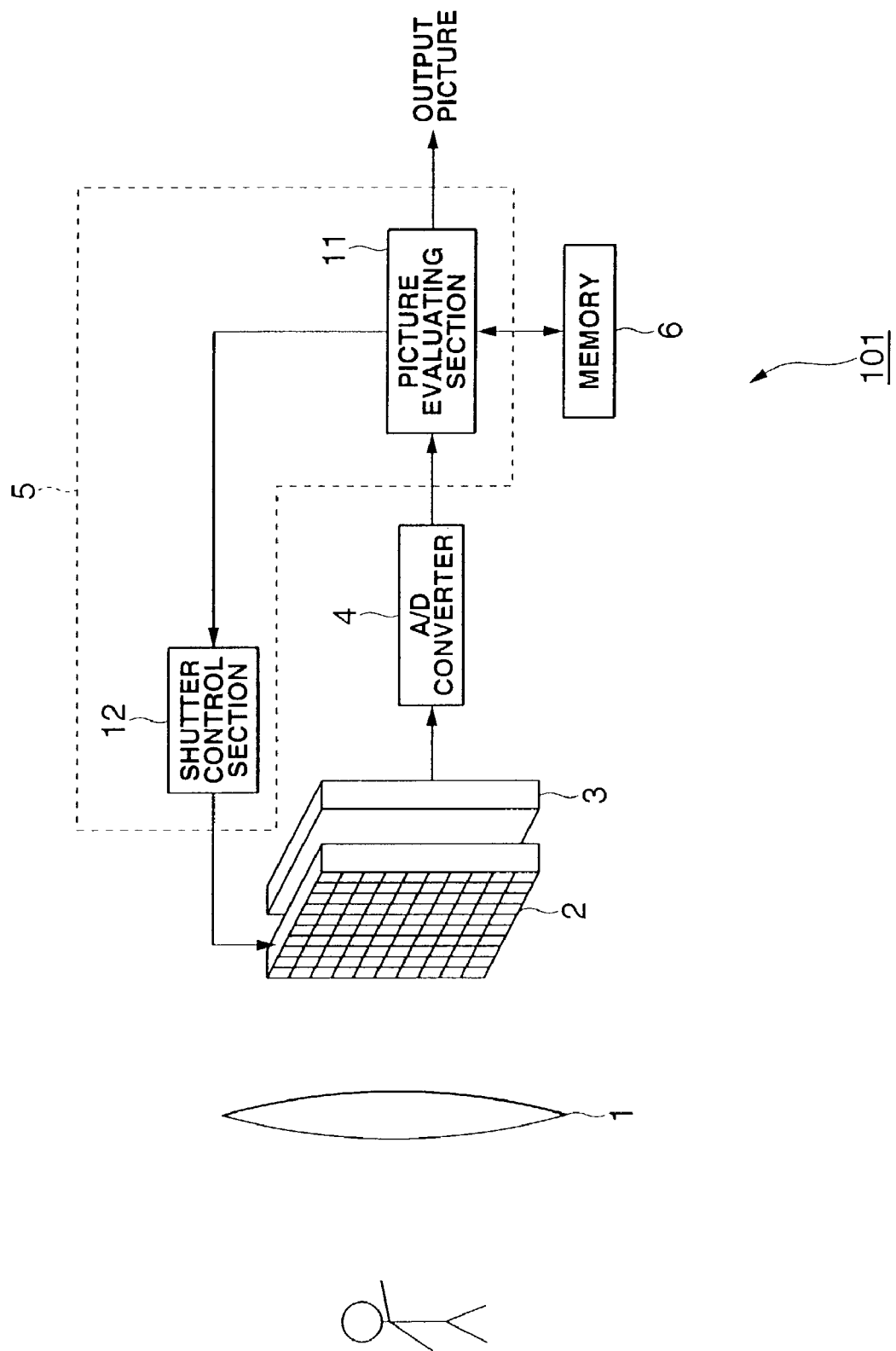
FIG. 4 is a block diagram showing an example of configuration of controller 5 of FIGS. 2 and 3.

FIG. 4 shows an example of the configuration of the controller 5 of FIGS. 2 and 3. The controller 5 is constituted with a picture evaluating section 11 and a shutter control section 12.

Pixel value delivered from the CCD 3 to the controller 5 through the A/D converter 4 is received at the picture evaluating section 11. The picture evaluating section 11 implements necessary processing to pixel value delivered thereto to constitute picture data of one frame to output such picture data. Further, the picture evaluating section 11 evaluates pixel value delivered thereto to set, in pixel units, exposure time by the shutter 2 on the basis of the evaluation result.

The shutter control section 12 controls the shutter 2 in accordance with exposure time every pixel set at the picture evaluating section 11.

Figure 5:
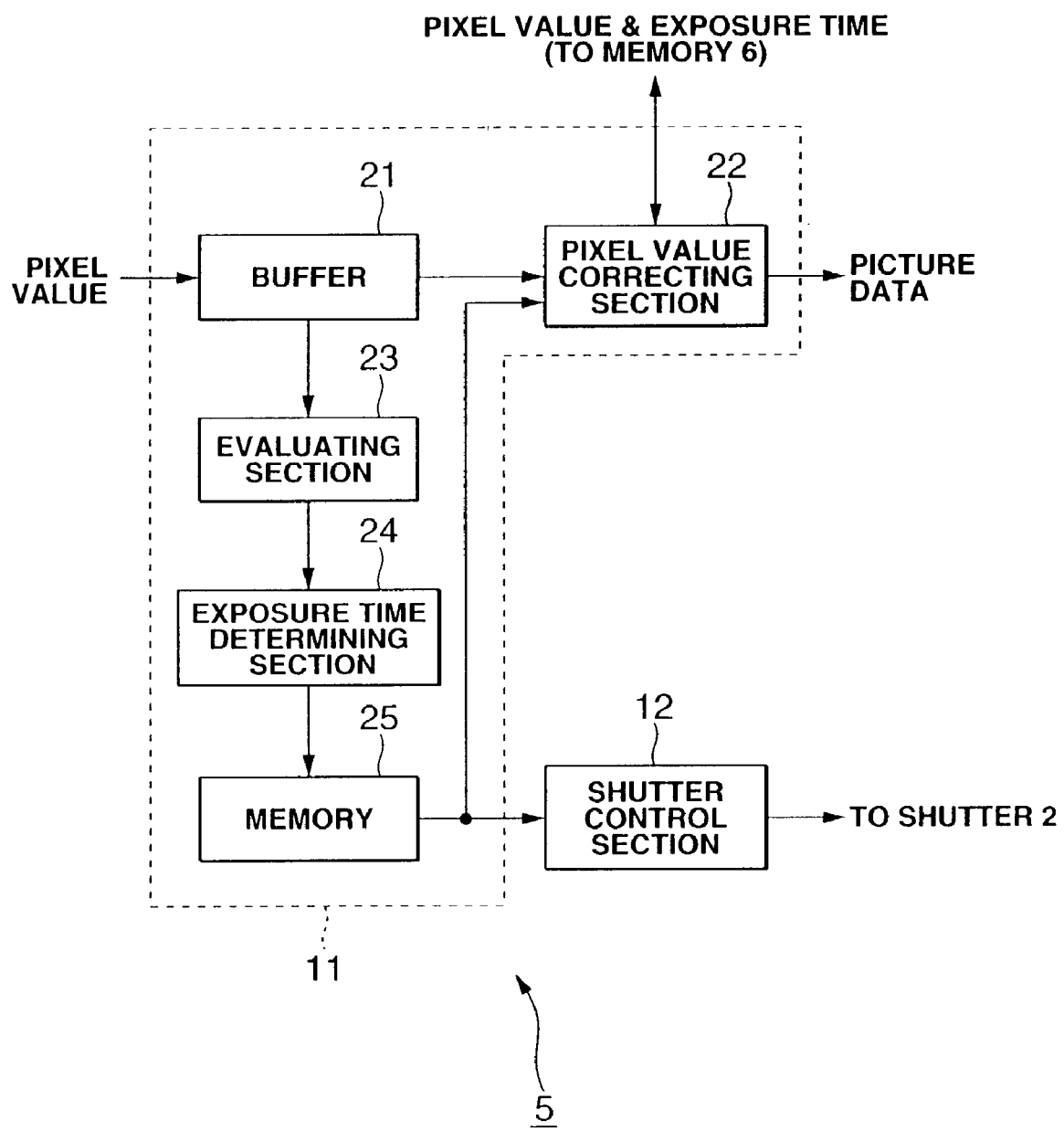
FIG. 5 is a block diagram showing an example of configuration of picture image evaluating unit 11 of FIG. 4.

FIG. 5 shows an example of the configuration of the picture evaluating section 11 of FIG. 4. Pixel value delivered from the CCD 3 to the controller 5 through the A/D converter 4 is received at a buffer 21, and the buffer 21 temporarily stores its pixel value.

A pixel value correcting section 22 reads out pixel value stored in the buffer 21 and reads out, from a memory 25, exposure time with respect to pixel when corresponding pixel value is obtained to deliver them to the memory 6 in a manner such that they are caused to correspond to each other to allow the memory 6 to store them. Further, the pixel value correcting section 22 is operative so that when, e.g., set of pixel value and exposure time corresponding to one frame is stored in the memory 6, it reads out the set of pixel value and exposure time to correct pixel value on the basis of exposure time to output picture data of one frame constituted by the corrected pixel value.

An evaluating section 23 evaluates pixel value stored in the buffer 21 to deliver its evaluation result to an exposure time determining section 24. The exposure time determining section 24 sets exposure time with respect to pixel of pixel value stored in the buffer 21 on the basis of evaluation result from the evaluating section 23. Namely, the evaluating section 23 evaluates pixel value stored in the buffer 21 to obtain evaluation result of whether pixel value is above upper limit or below lower limit, or movement quantity of object, etc. to deliver its evaluation result to the exposure time determining section 24. The exposure time determining section 24 is adapted so that when, e.g., pixel value is value above a predetermined value and there results white overexposure state, it sets exposure time with respect to corresponding pixel to shorter value. Moreover, the exposure time determining section 24 is adapted so that when, e.g., pixel value is value below predetermined value and there results black underexposure state, it sets exposure time with respect to corresponding pixel to longer value. Further, the exposure time determining section 24 is adapted so that when, e.g., movement quantity of object is large and there results unintentional movement (movement blurring), it sets exposure time with respect to corresponding pixel to shorter value. In addition, the exposure time determinating section 24 is adapted so that when, e.g., movement quantity of object is small (no movement quantity) and there results no unintentional movement (blurring), exposure time with respect to corresponding pixel is caused to remain at present value.

Further, the exposure time determinating section 24 delivers exposure time set with respect to pixel to a memory 25. In this embodiment, for simplifying explanation, it is assumed that there is hardly movement of object itself. Accordingly, it is assumed that unintentional movement (movement blurring) referred to here results from the so-called hand movement of user who carries out photographing. It is to be noted that this invention can be applied to the case where object having large movement is photographed (imaged).

The memory 25 stores (overwrites) exposure times with respect to respective pixels from the exposure time determinating section 24 at address of corresponding position. Exposure times with respect to respective pixels stored in the memory 25 are delivered to a shutter control section 12, and the shutter control section 12 controls the shutter 2 in accordance with exposure times every respective pixels. Thus, incident time of light upon the CCD 3 through the shutter 2 is controlled every pixel. In this time, the exposure time and the shutter speed are synonym. It is to be noted that the fact that the exposure time is long corresponds to the fact that the shutter speed is low and the fact that the exposure time is short corresponds to the fact that the shutter speed is high. While explanation will be given by using exposure time in the following description, it is possible as a matter of cause that explanation will be given by using shutter speed.

Figure 6:
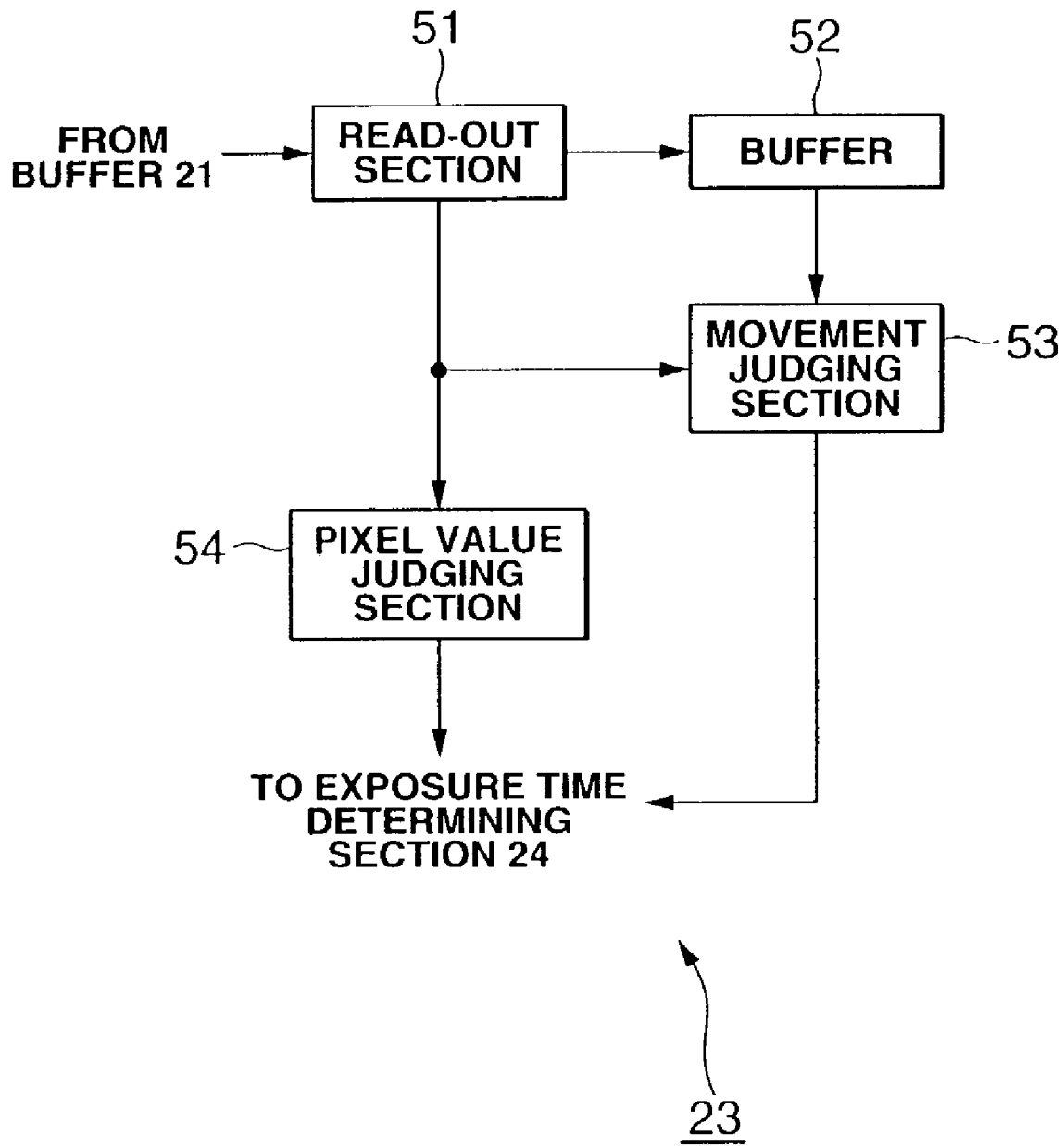
FIG. 6 is a block diagram showing an example of configuration of evaluating section 23 of FIG. 5.

FIG. 6 shows an example of the configuration of evaluating section 23 of FIG. 5. A read-out section 51 reads out pixel value of pixel stored in the buffer 21 (FIG. 5) to deliver such pixel value to a buffer 52 to allow the buffer 52 to store it. Further, the read-out section 51 allows pixels of which pixel values have been read out from the buffer to be remarked pixels in order to deliver pixel value of that remarked pixel (remarked pixel value) to a movement judging section 53 and a pixel value judging section 54.

The buffer 52 has memory capacity capable of storing, e.g., pixel values corresponding to plural frames, and stores in order pixel values delivered from the read-out section 51. In this example, the buffer 52 is adapted to store new pixel value, e.g., in such a form to overwrite the new pixel value onto the oldest pixel value after it stores pixel value by its memory capacity.

The movement judging section 53 receives pixel value of remarked pixel from the read-out section 51 to read out, from the buffer 52, e.g., 3×3 pixels in frame preceding by one frame of remarked frame (hereinafter referred to as preceding frame as occasion demands) corresponding to 3×3 pixels with remarked pixel being as center at frame of the remarked pixel (hereinafter referred to as remarked frame as occasion demands). Further, the movement judging section 53 calculates absolutes of differences between respective pixel values of 3×3 pixels of remarked frame and respective pixel values of corresponding 3×3 pixels at the preceding frame to further calculate its sum total (hereinafter referred to as difference absolute value sum as occasion demands). Further, the movement judging section 53 judges magnitude of movement of remarked pixel on the basis of the difference absolute value sum to deliver its judgment result to the exposure time determining section 24 (FIG. 5) as evaluation result of remarked pixel. Namely, the movement determining section 53 is operative so that when difference absolute value is large, it delivers output to the effect that movement is large to the exposure time determining section 24 as evaluation result, while when difference absolute value is small, it delivers output to the effect that movement is small to the exposure time determining section 24 as evaluation result. It is to be noted that, at the movement judging section 53, in addition to the above, e.g., 3×3 pixels of the above-described remarked frame may be used to carry out block matching between current frame and forward (preceding) frame to judge magnitude of movement of the remarked pixel on the basis of moving vector obtained as the result of the block matching.

The pixel value judging section 54 judges whether or not pixel value of remarked pixel is value within a predetermined range prescribed by a predetermined lower limit value and a predetermined upper limit value to deliver its judgment result to the exposure time determining section 24 as evaluation result of the remarked pixel.

Namely, in the case where pixel value that the A/D converter 4 (FIGS. 2 to 4) outputs is represented by 8 bits corresponding to, e.g., the range of 0 to 255, the pixel value judging section 54 allows, e.g., value where there results black underexposure state (e.g., 10 or less) to be lower limit value and allows value where there results white overexposure state (e.g., 250, etc.) to be upper limit value, thus to judge whether or not pixel value of remarked pixel exists within the range from lower limit value to upper limit value. Further, the pixel value judging section 54 is operative so that in the case where pixel value of remarked pixel is upper limit or more (or value larger than upper value), in the case where it is lower limit value or less (or value less than the lower limit value) and in the case where it is larger than the lower limit value and is smaller than the upper limit value, the pixel value judging section 54 delivers outputs to the effect of these cases to the exposure time determining section 24 as evaluation result of remarked pixel.

The exposure time determining section 24 of FIG. 5 receives evaluation result of remarked pixel as described above from the movement judging section 53 and the pixel value judging section 54 to set exposure time in a manner as described above on the basis of the evaluation result.

Figure 7:
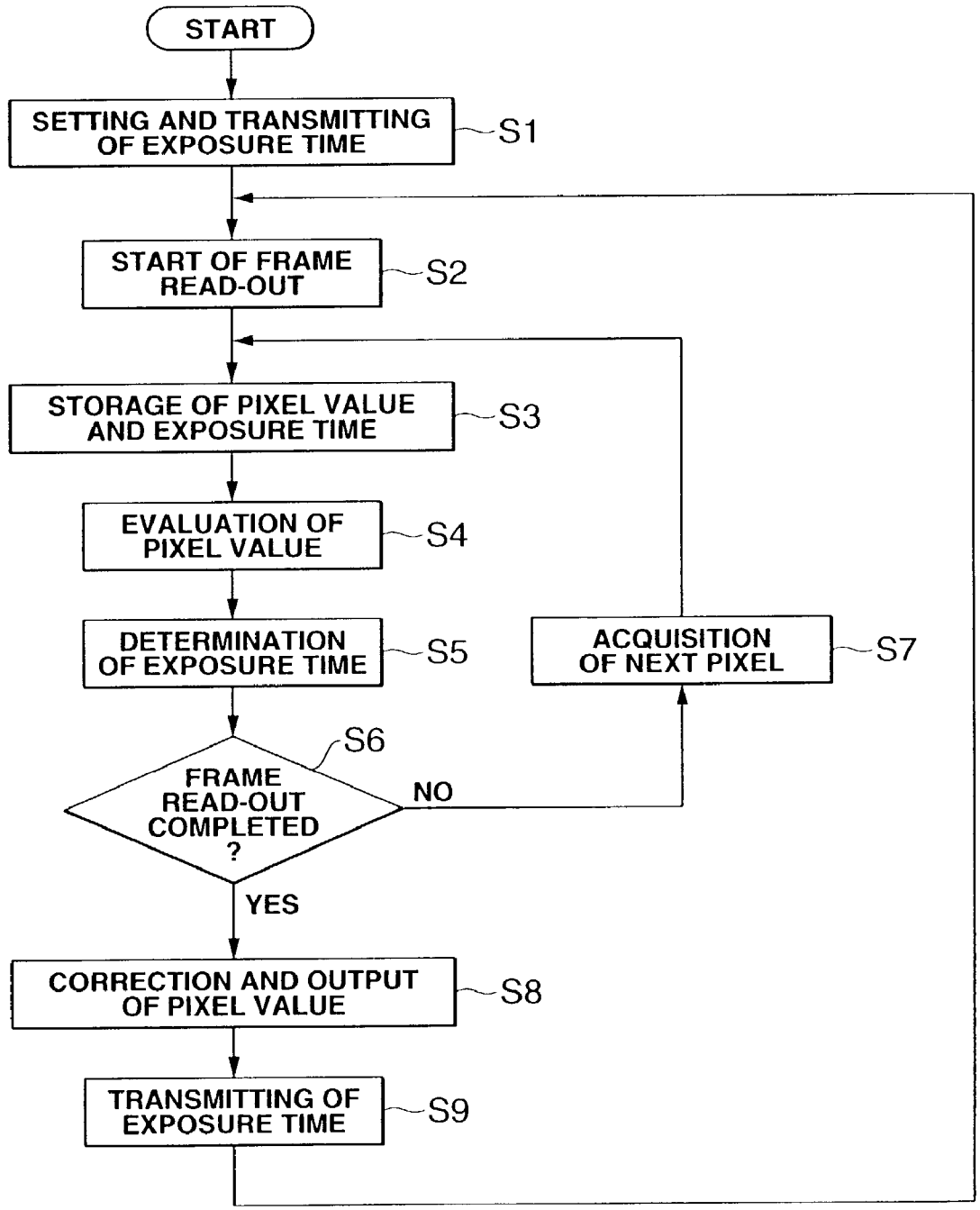
FIG. 7 is a flowchart for explaining operation of digital video camera 101 of FIG. 4 (FIGS. 2 and 3).

The operation of the digital video camera of FIG. 4 (FIGS. 2 and 3) will now be described with reference to the flowchart of FIG. 7.

Initially, at step S1, the exposure time determining section 24 of the controller 5 (FIG. 5) sets exposure times of default with respect to respective pixels to transmit such exposure times to the memory 25 to allow the memory 25 to store them at corresponding addresses. In this example, it is assumed that the same exposure time is set with respect to all pixels, e.g., as exposure time of default. It is to be noted that, as exposure time of default, e.g., exposure times of respective pixels at the time of completion of the last photographing, etc. may be set. In addition, exposure time of default may be set by user, for example. In this case, FIG. 8A shows memory content of memory 25. As described above, at the memory 25, exposure times with respect to corresponding pixels are stored at addresses corresponding to pixel positions of respective pixels. The shutter control section 12 controls the shutter 2 in accordance with exposure times every pixels stored at the memory 25. Thus, while incident times of light upon CCD 3 through the shutter 2 are controlled every pixel, electric charges are charged at respective pixels of the CCD 3.

Further, when there results read-out start timing of pixel value constituting one frame, its read-out operation is started from the CCD 3 at step S2. Pixel value which has been read out from the CCD 3 is delivered to a buffer 21 of the controller 5 (FIG. 5) through the A/D converter 4, and is stored thereat.

Pixel value stored in the buffer 21 is read out by pixel value collecting section 22 at step S3. Further, at the step S3, the pixel value collecting section 22 reads out exposure time stored at address of the memory 25 corresponding to remarked pixel with pixels of pixel values which have been read out from the buffer 21 being as remarked pixel in order, i.e., exposure time used for the purpose of obtaining pixel value of remarked pixel to deliver such exposure time to the memory 6 in such a manner that it is caused to correspond to pixel value of remarked pixel to allow the memory 6 to store the exposure time. Thus, in the case where exposure time as shown in FIG. 8A, for example, is stored at the memory 25, exposure time of FIG. 8A and pixel value obtained by that exposure time are stored at the memory 6 in such a manner that they are caused to correspond to each other as shown in FIG. 8B.

Further, processing proceeds to step S4. The evaluating section 23 (FIG. 6) evaluates pixel value of remarked pixel stored at the buffer 21 in a manner as described above at the movement judging section 53 and the pixel value judging section 54 to deliver its evaluation result to the exposure time determining section 24. The exposure time determining section 24 sets, for a second time, exposure time of remarked pixel to reasonable value as described above on the basis of evaluation result from the evaluating section 23 at step S5. Further, the exposure time determining section 24 delivers the exposure time which has been set for a second time to the memory 25 to allow the exposure time to be stored (overwritten) in address corresponding to remarked pixel. Namely, e.g., in FIG. 8B, pixel value "250" is value of the above-described upper limit "250" or more. Accordingly, it is considered that there results state of white overexposure state. For this reason, the exposure time determining section 24 sets for a second time exposure time of pixel of pixel value "250" (exposure time of address n+1 of memory 25) "1/100 sec." to shorter "1/120 sec." to allow the memory 25 to store it as shown in FIG. 8C.

Thereafter, processing proceeds to step S6. Whether or not read-out operation of all pixel values Constituting one frame from the buffer 21 is completed is judged by, e.g., control unit (not shown), etc. In the case where it is judged that read-out operation is not yet completed, processing proceeds to step S7, at which pixel value of the next pixel is acquired from the buffer 21. Thus, processing returns to the step S3. Further, processing at step S3 and at steps subsequent thereto will be repeated with pixel of that pixel value being newly as remarked pixel.

On the other hand, in the case where it is judged at the step S6 that read-out operation of all pixel values constituting one frame is completed, i.e., in the case where pixel values of all pixels constituting one frame and exposure times caused to correspond thereto are stored, processing proceeds to step S8. Thus, the pixel value correcting section 22 (FIG. 5) reads out respective pixel values from the memory 6 to correct respective pixel values on the basis of exposure times caused to correspond to those pixel values to output picture data of one frame constituted with corrected pixel value.

Namely, since respective pixel values constituting one frame are not pixel values obtained by the same exposure time, when such pixel values are used as they are to constitute picture of one frame, there results a picture image in which brightness is sparse or thin. In view of this, the pixel value correcting section 22 corrects respective pixel values on the basis of exposure time to thereby constitute a picture image such that there is feeling of unity in brightness and all pixels are photographed by the same exposure time.

In more practical sense, for the purpose of simplifying explanation, e.g., exposure time and pixel value are assumed to be proportional relationship. In the pixel value correcting section 22, when, e.g., the shortest exposure time $1/S_{BASE}$ [sec.] of exposure times stored in the memory 6 is assumed as reference and set of pixel value p exposure time 1/S [sec.] and exposure time is expressed as (p, 1/S), in the case where combination of pixel value and exposure time stored in the memory 6 is, e.g., (255, 1/10), (200, 1/5), (150, 1/20), (100, 1/100), since the shortest exposure time $1/S_{BASE}$ is 1/100 sec., pixel value "255" where exposure time is 1/10 sec. is corrected to "25.5" (=255×10/100), pixel value "200" where exposure time is 1/5 sec. is corrected to "10" (=200×5/100), pixel value "150" where exposure time is 1/20 sec. is corrected to "30" (=150× 20/100), and pixel value "100" where exposure time is 1/100 sec. is corrected to "100" (=100×100/100). It is to be noted that pixel value "100" of the shortest exposure time "1/100 sec." serving as reference is not changed before and after correction, it is not necessarily required to make correction.

While, in the above-described case, the shortest exposure time $1/S_{BASE}$ is caused to be as reference to make a correction such that pixel values to which respective exposure times 1/S are caused to correspond are changed to multiple of $S/S_{BASE}$, such an approach may be also employed in addition to the above to, e.g., use the longest exposure time $1/S_{BASE}'$ [sec.] of exposure times stored in the memory 6 as reference to make a correction such that pixel values to which respective exposure times 1/S are caused to correspond are changed to multiple of $S/S_{BASE}'$. In this case, with respect to sets of the above-described pixel value and exposure time (255, 1/10), (200, 1/5), (150, 1/20), (100, 1/100), because the longest exposure time $1/S_{BASE}'$ is 1/5, pixel value "255" where exposure time is 1/10 sec. is corrected to "510" (=255×10/5), pixel value "200" where exposure time is 1/5 sec. is corrected to "200" (=200× 5/5), pixel value "150" where exposure time is 1/20 sec. is corrected to "600" (=150×20/5) and pixel value "100" where exposure time is 1/100 sec. is corrected to "2000" (=100×100/ 5).

It is to be noted that the pixel value correcting section 22 can carry out correction of pixel values with exposure times except for the shortest exposure time and the longest exposure time being as reference in addition to the above.

From the foregoing description, when pixel value that the A/D converter 4 outputs is assumed to be M bits, there are the cases where pixel value constituting corrected picture that the pixel value correcting section 22 outputs may be the number of bits above M bits. Namely, while pixel values that the A/D converter 4 outputs are 8 bits, pixel values constituting corrected picture that the pixel value correcting section 22 outputs is the number of bits above 8 bits. As a result, from the pixel value correcting section 22, even if object has high contrast, picture image in which its contrast is sufficiently represented, i.e., picture image in which dynamic range is caused to be larger than the number of output bits of the A/D converter 4.

While the shortest exposure time is caused to be reference in this example, exposure time serving as reference may be arbitrary value. Namely, exposure time serving as reference may be exposure times except for the shortest exposure time stored in the memory 6, or may be exposure time which is not stored in the memory 6. Accordingly, correction of pixel value can be carried out, e.g., with 1/1 sec. being as reference. In this case, pixel value obtained by multiplying pixel value p by inverse number S of exposure time 1/S caused to correspond thereto results in corrected pixel value.

It is to be noted that even if correction is made with any exposure time being as reference value, dynamic range of picture similarly becomes large.

When picture data consisting of corrected pixel value as stated above is outputted at step S8, processing proceeds to step S9. As the result of the fact that processing of steps S4 to S7 are repeated, exposure times every respective pixels stored in the memory 25 are transmitted to shutter control section 12. Thus, processing returns to the step S2. At times subsequent thereto, with respect to the next frame, similar processing is repeated. Accordingly, with respect to the next frame, imaging of picture is carried out by exposure times every respective pixels stored in the memory 25.

As described above, such an approach is employed to evaluate pixel value that the CCD 3 outputs to set, in pixel units, exposure time with respect to the light receiving surface of the CCD 3 by the shutter 2 on the basis of its evaluation result to carry out image pick-up operation of object. Accordingly, even if there is employed object of high contrast, it is possible to obtain picture of which detail is not injured.

Moreover, in general, the dynamic range of CCD is not so broad, but exposure times are controlled every pixels as described above, thereby making it possible to provide the effect similar to the case where the dynamic range of the CCD 3 (or the A/D converter 4) is broadened.

While, in the above-described case, such an approach is employed to collect respective pixel values stored in the memory 6 on the basis of exposure times caused to correspond to those pixel values and to output them, respective pixel values stored in the memory 6 may be outputted along with exposure times caused to correspond to those pixel values as they are to record such pixel values onto recording medium 103 or to carry out transmission thereof through transmission medium 104.

Figure 9:
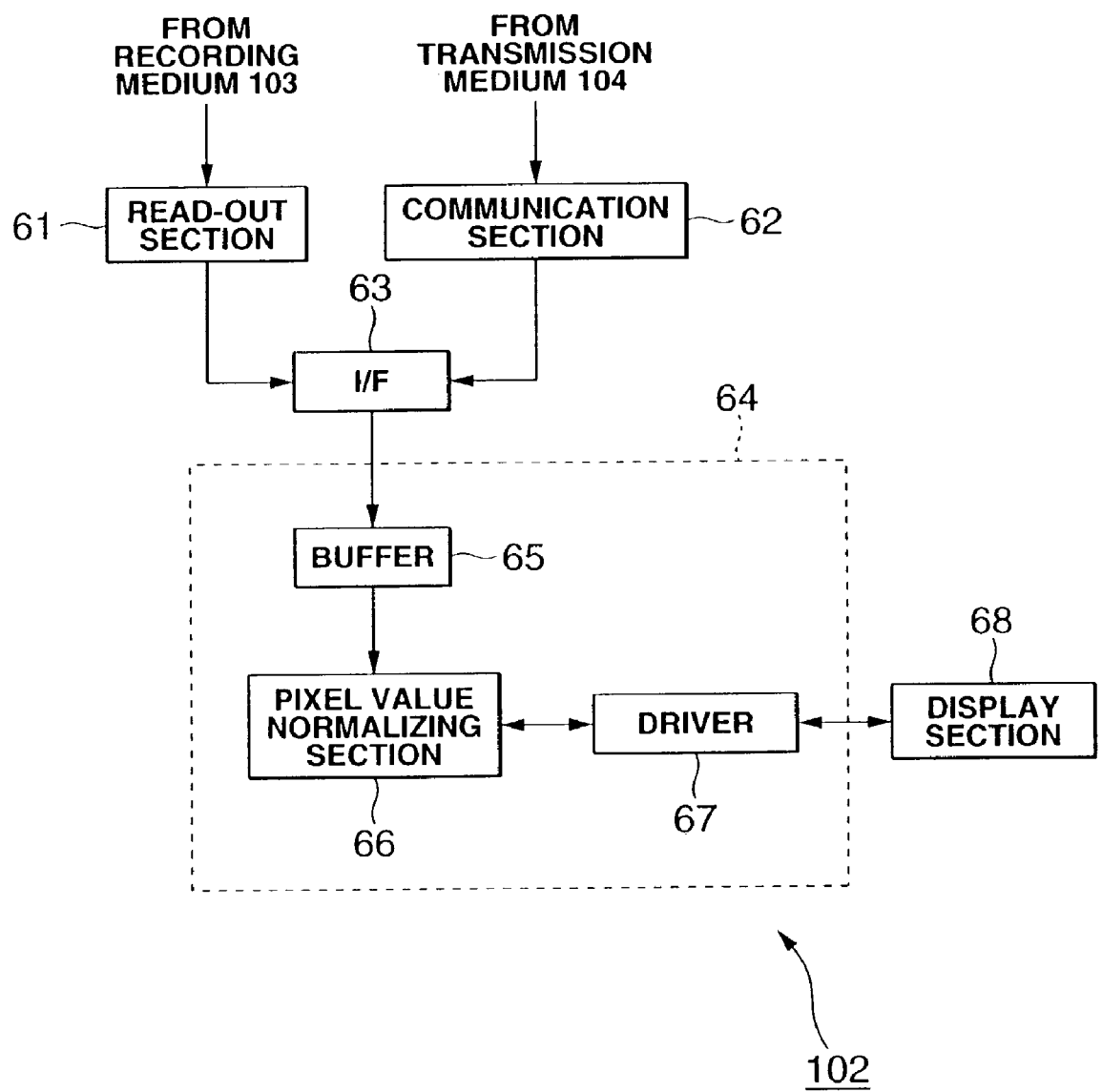
FIG. 9 is a block diagram showing an example of configuration of display unit 102 of FIG. 1.

FIG. 9 shows an example of the configuration of the display section 102 of FIG. 1. A read-out section 61 reads out (reproduces), from recording medium 103, picture information recorded thereon (corrected pixel value, or pixel value and exposure time) to deliver it to an I/F 63. A communication section 62 receives picture information transmitted through the transmission medium 104 to deliver it to the I/F 63. The I/F 63 receives picture information delivered from the read-out section 61 or the communication section 62 to deliver it to a display control section 64. The display control section 64 is composed of a buffer 65, a pixel value normalizing section 66, and a driver 67. The buffer 65 receives picture information delivered from the I/F 63 to temporarily store it in units of one frame, for example. The pixel value normalizing section 66 reads out picture information stored in the buffer 65 to normalize that picture information on the basis of display accuracy of a display section 68.

Namely, the pixel value normalizing section 66 recognizes, through the driver 67, display accuracy of the display section 68, i.e., what bit of pixel value the display section 68 can display. In this example, display accuracy of the display section is assumed to be K bits. Further, the pixel value normalizing section 66 is operative so that in the case where picture information corresponding to one frame stored in the buffer 65 is corrected pixel value (hereinafter referred to as corrected pixel value, it detects the maximum value thereof. Now, in the case where this maximum pixel value is expressed as K' (>K), the pixel value normalizing section 66 rounds down lower order K'-K bits of respective corrected pixel value stored in the buffer 65 to normalize pixel value so that K bits are provided. Moreover, the pixel value normalizing section 66 is operative so that in the case where picture information stored in the buffer 65 is pixel value p and exposure time 1/S, e.g., it multiplies pixel value p by inverse number S of exposure time 1/S similarly to the case in the pixel value correcting section 22 of FIG. 5 to thereby correct pixel value p to determine corrected pixel value pxS. Further, similarly to the above-described case, the pixel value normalizing section 66 rounds down lower order K'-K bits of respective corrected pixel value to normalize pixel value so that K bits are provided. The pixel value normalizing section 66 normalizes pixel value in a manner as stated above to deliver pixel value after normalization (hereinafter referred to as normalized pixel value as occasion demands) to the driver 67.

The driver 67 communicates with the display section 68 to thereby recognize its display accuracy. Alternatively, the driver 67 recognizes in advance display accuracy of the display section 68. Further, the driver 67 delivers display accuracy of the display section 68 to the pixel value normalizing section 66 in accordance with request of the pixel value normalizing section 66. In addition, the driver 67 drives the display section 68 in accordance with normalized pixel value delivered from the pixel value normalizing section 66 to thereby display picture image on the display section 68. The display section 68 is comprised of, e.g., CRT or liquid crystal display, etc., and serves to display picture image in accordance with control from the driver 67.

Figure 10:
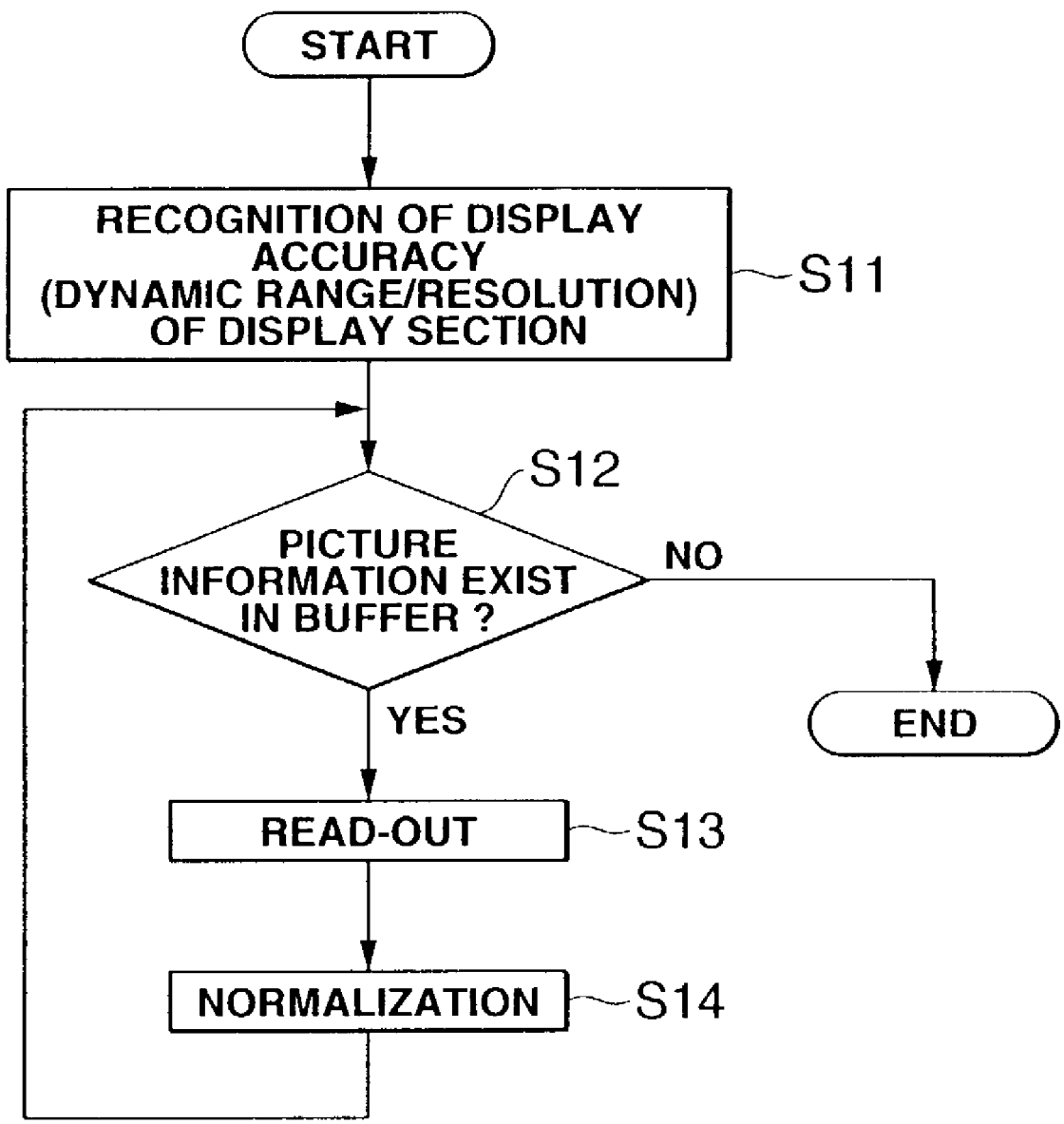
FIG. 10 is a flowchart for explaining processing of display unit 102 of FIG. 9.

The display unit 102 of FIG. 9 will now be described with reference to the flowchart of FIG. 10. The I/F 63 receives picture information delivered from the read-out section 61 or the communication section 62 to deliver it in order one by one frame to the buffer 65 of the display control section 64 to allow the buffer 65 to store it.

Further, at step S11, the pixel value normalizing section 66 recognizes display accuracy of the display section 68 through the driver 67. It is to be noted that since the display accuracy indicates that the display section 68 can display the number of bits of pixel value which can be displayed as described above, the display accuracy may be dynamic range which is difference between the maximum value and the minimum value of pixel value that the display section 68 can display, or resolution which is the minimum value of difference between pixel values that the display section 68 can discriminate.

Thereafter, processing proceeds to step S12. The pixel value normalizing section 66 judges whether or not picture information is stored in the buffer 65. In the case where it is judged at the step S12 that picture information is stored in the buffer 65, processing proceeds to step S13. The pixel value normalizing section 66 reads out picture information of one frame from the buffer 65. Thus, processing proceeds to step S14.

At the step S 14, the pixel value normalizing section 66 is operative so that in the case where picture information which has been read out from the buffer 65 is corrected pixel value, it normalizes its corrected pixel value in a manner as described above to thereby allow such corrected pixel value to be normalized pixel value to deliver it to the driver 67. Thus, processing returns to the step S12. Moreover, the pixel value normalizing section 66 is operative so that in the case where picture information which has been read out from the buffer 65 is pixel value and exposure time, pixel value is corrected by exposure time to thereby allow that pixel value to be corrected pixel value. Further, the pixel value normalizing section 66 normalizes its corrected pixel value in a manner as described above to thereby allow such corrected pixel value to be normalized pixel value to deliver it to the driver 67. Thus, the processing returns to the step S12. Thus, at the driver 67, the display section 68 is driven in accordance with the normalized pixel value from the pixel value normalizing section 66. Thus, corresponding picture image, i.e., picture image effectively utilizing dynamic range (resolution) of the display section 68 is displayed.

It is to be noted that while the number of bits K that the display section 68 can display as display accuracy of the display section 68 is caused to be smaller than the number of bits K' of corrected pixel value in this example, in the case where the number of bits K which is display accuracy of the display section 68 is more than the number of bits K' of corrected pixel value, there is no necessity to carry out normalization as described above at the pixel value normalizing section 66 and accordingly, the pixel value normalizing section 66 delivers corrected pixel value to the driver 67 as it is.

On the other hand, in the case where it is judged at the step S12 that picture information is not stored in the buffer 65, processing is completed.

Figure 11:
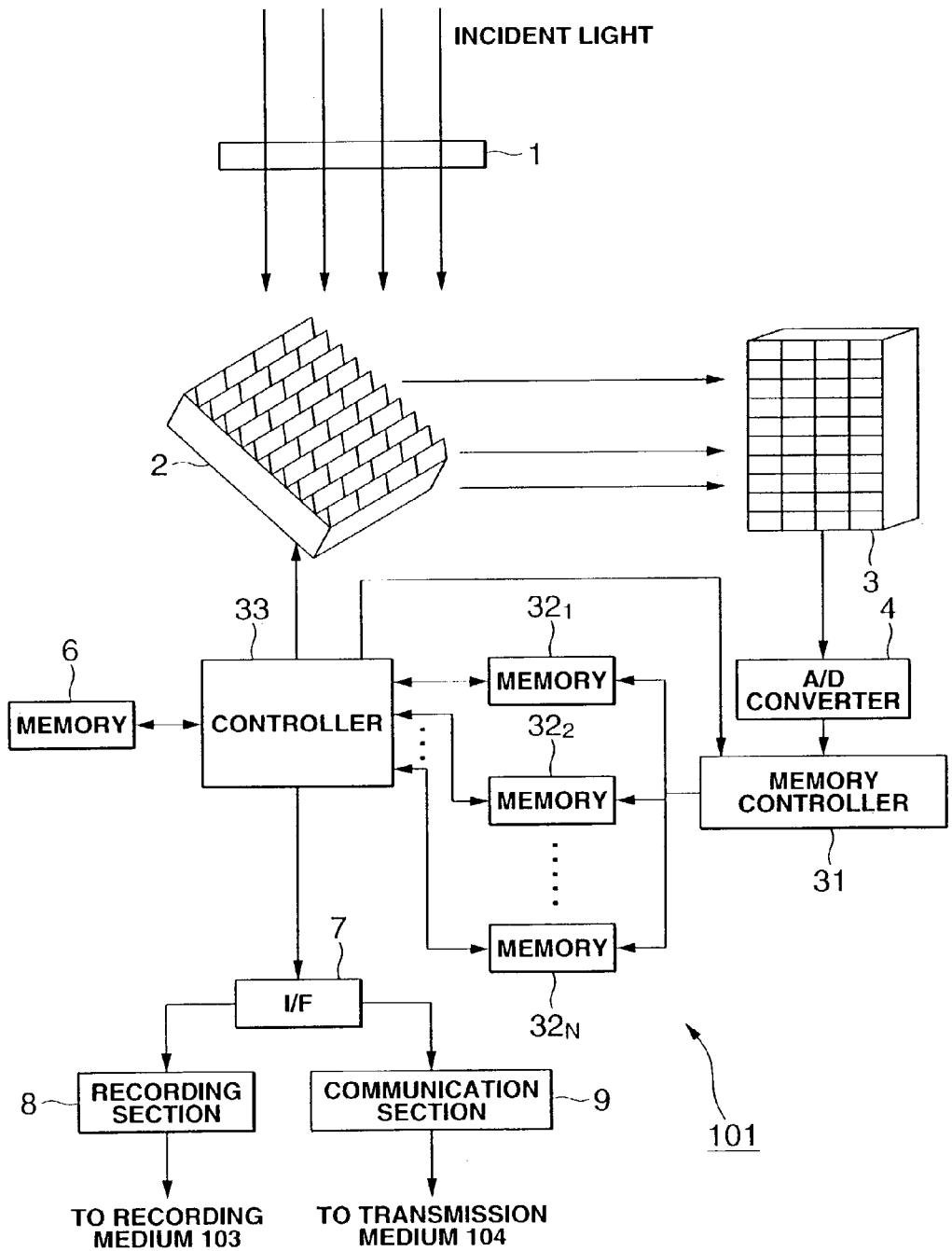
FIG. 11 is a block diagram showing an example of configuration of a third embodiment of digital video camera 101 to which this invention is applied.

FIG. 11 shows an example of the configuration of a third embodiment of digital video camera 101 of FIG. 1. It is to be noted that the same reference numerals are respectively attached to portions corresponding to the case in FIG. 2 or FIG. 3 in the figure, and their explanation will be omitted as occasion demands. Namely, the digital video camera 101 of FIG. 11 is constituted essentially similarly to the case in FIG. 2 or FIG. 3 except that a memory controller 31 and memories $32_1, 32_2, \ldots, 32_N$ are newly provided and a controller 33 is provided in place of the controller 5.

It is to be noted that while shutter 2 is constituted with DMD similarly to the case in FIG. 2 in the embodiment of FIG. 11, it may be constituted with liquid crystal shutter as in the case in FIG. 3. In FIG. 11, the shutter 2 is only required to have ability to equally turn ON/OFF incidence of light upon the CCD 3 with respect to all pixels constituting the CCD 3. Accordingly, there is no necessity to constitute DMD or liquid crystal shutter, etc. which controls, in pixel units, incidence of light upon the CCD 3.

The memory controller 31 delivers pixel value delivered through the A/D converter 4 from the CCD 3 to any one of frame memories $32_1$ to $32_N$ in accordance with control from the controller 33 to allow it to store the pixel value. The memories $32_1$ to $32_N$ are adapted to store pixel value delivered from the memory controller 31.

The controller 33 sets plural exposure times in the shutter 2 to control the shutter 2 by respective plural exposure times so that light from object is incident upon the CCD 3. Accordingly, in this case, in the CCD 3, pixel values constituting one frame are outputted with respect to respective plural exposure times set at the controller 33. Namely, rays of light by respective plural exposure times that the controller 33 has set are incident, within period, upon the CCD 3. Thus, at the CCD 3, with respect to respective frames, pixel values of plural pictures corresponding to respective plural exposure times are outputted. Further, the controller 33 controls the memory controller 31 in a manner as described above so that pixels constituting plural pictures corresponding to respective plural exposure times are stored into the same memory $32_n$ (n=1, 2, ..., N) every exposure times. For example, in the controller 33, when N exposure times are assumed to be set and exposure time short at the n-th order is assumed to be the n-th exposure time, the controller 33 controls the memory controller 31 so that pixel value of picture corresponding to the n-th exposure time outputted through the A/D converter 4 from the CCD 3 is stored into the memory $32_n$. Moreover, the controller 33 selects one pixel value with respect to pixel of that position from plural pixel values of pixels of the same position constituting pictures corresponding to plural exposure times stored in respective memories $32_1$ to $32_N$ to constitute picture of one frame by the selected pixel value. Further, similarly to the controller 5, the controller 33 corrects, as occasion demands, pixel values constituting picture of one frame constituted in a manner as described above on the basis of exposure times when those pixel values are obtained to output, in units of one frame, for example, picture data consisting of the corrected pixel value. In the following description, at the controller 33, N(N is integer equal to 2 or more) exposure times as plural exposure times are assumed to be set.

Figure 12:
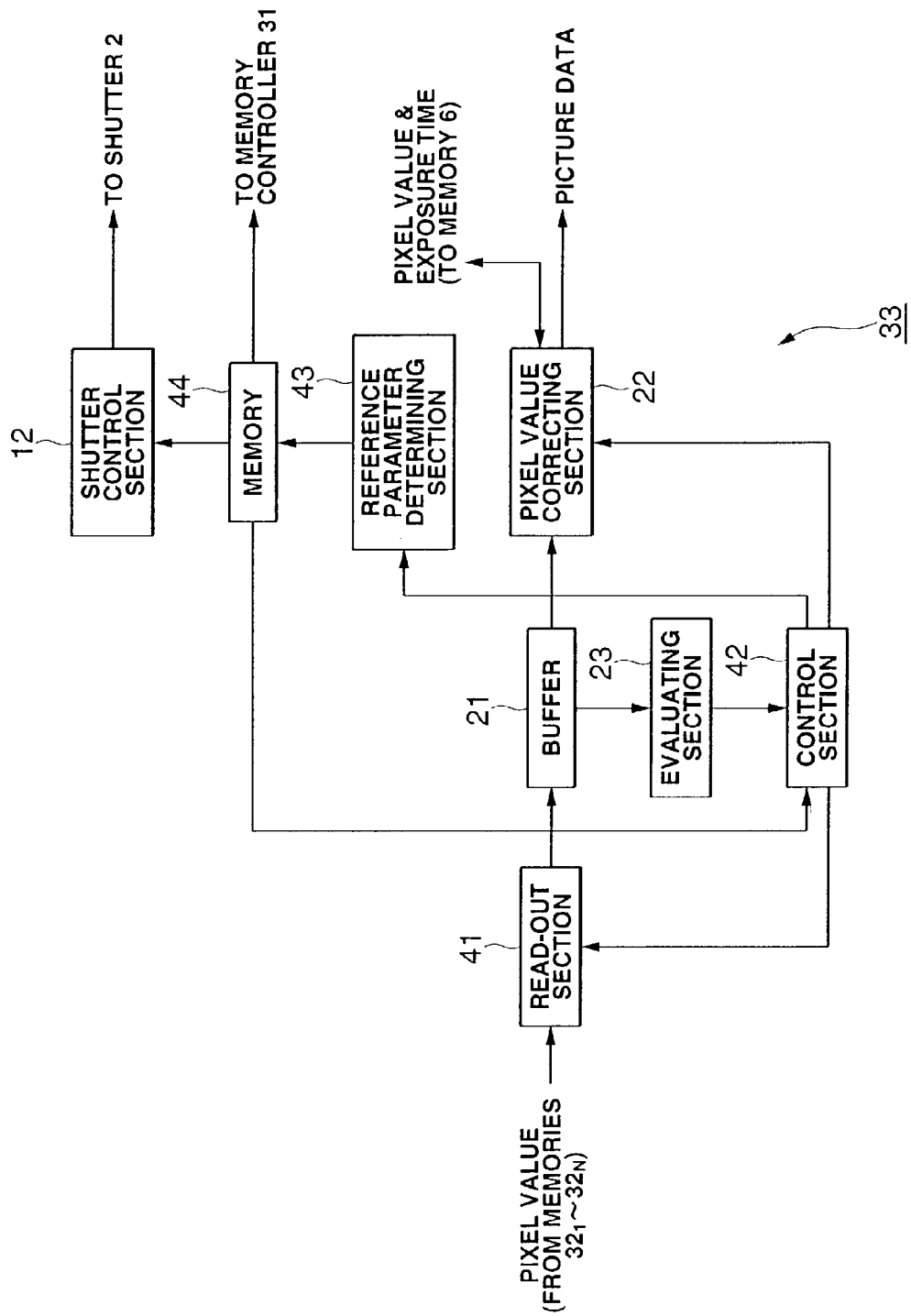
FIG. 12 is a block diagram showing an example of configuration of controller 33 of FIG. 11.

FIG. 12 shows an example of the configuration of the controller 33 of FIG. 11. It is to be noted that the same reference numerals are respectively attached to portions constituted similarly to the controller 5 of FIG. 5 in the figure and their explanation will be omitted as occasion demands. A read-out section 41 reads out pixel value of remarked pixel from any one of memories $32_1$ to $32_N$ in accordance with control of a control section 42 to deliver it to the buffer 21. The control section 42 controls the pixel value correcting section 22, the read-out section 41 and a reference parameter determining section 43 while making reference to evaluation result of pixel value stored in the buffer 21 by the evaluating section 23 and N exposure times stored in the memory 44 as occasion demands.

The reference parameter determining section 43 determines reference parameter serving as reference in determining N exposure times on the basis of control from the control section 42. Namely, the reference parameter determining section 43 determines, as reference parameter, e.g., parameter for determining one exposure time serving as reference and the remaining N−1 exposure times with that exposure time being as reference. In this case, as parameter for determining other (N−1) exposure times of the exposure time serving as reference, there are, e.g., parameters as described below. Namely, in digital video cameras, in general, plural exposure times which can be used are set in advance. Accordingly, in the case where a certain exposure time is caused to be reference, exposure time short by one step (stage) with respect thereto or exposure time long by one step (stage) with respect thereto is univocally determined. Accordingly, such number of steps (stages) may be used as reference parameter.

When the reference parameter determining section 43 determines reference parameter, it sets N exposure times on the basis of the reference parameter. Namely, the reference parameter determining section 43 allows, e.g., exposure time determined as reference parameter to be the first exposure time which is the shortest value of N exposure times, and allows exposure times longer every number of stages determined as reference parameter to be set to the second exposure time, the third exposure time, ..., the N-th exposure time in order. Accordingly, when, e.g., plural exposure times set in advance in digital video camera are expressed as $S_1, S_2, \ldots, S_N$ (M is integer value larger than N) in order of shorter exposure times, N exposure times of $S_k, S_{k-1}, \ldots, S_{k-N+1}$ are set with respect to the reference parameter where exposure time of reference is $S_k$ (k is integer greater than 1 and smaller than M) and the number of stages is 1. Moreover, with respect to reference parameter where, e.g., exposure time of reference is $S_k$ and the number of stages is 2, N exposure times of $S_k, S_{k-2}, S_{k-4}, \ldots, S_{k-2(N-1)}$ are set. It is to be noted that, at the reference parameter determining section 43, at the time of setting N exposure times on the basis of reference parameter, such an approach may be also employed to linearly or non-linearly change the number of stages of those N exposure times adjacent to each other. Namely, at the reference parameter determining section 43, N exposure times, e.g., $S_k$, $S_{k-1}$, $S_{k-3}$, $S_{k-6}$, $S_{k-10}$, ..., can be set.

The memory 44 stores (overwrites) N exposure times set at the reference parameter determining section 43. N exposure times stored in the memory 44 are adapted so that they are delivered to shutter control section 12, memory controller 31 (FIG. 11) and control section 42. Thus, the shutter control section 12 controls the shutter 2 so that light from object is incident upon the CCD 3 at respective N exposure times, and the memory controller 31 allows any one of memories $32_1$ to $32_N$ to store, every exposure time, pixel values from A/D converter 4 which are obtained with respect to N exposure times.

The operation of the digital video camera of FIG. 11 will be described with reference to the flowchart of FIG. 13.

First of all, at step S21, the reference parameter determining section 43 of the controller 33 (FIG. 12) sets N exposure times on the basis of reference parameter of default to transmit such exposure times to the memory 44 to allow the memory 44 to store them. The shutter control section 12 controls the shutter 2 in accordance with respective N exposure times stored in the memory 44, i.e., controls the shutter 2 in accordance with respective N exposure times in tine divisional manner within frame period. Thus, pixel values constituting pictures corresponding to respective N exposure times are outputted in time divisional manner from the CCD 3. Pixel values constituting pictures corresponding to respective N exposure times that the CCD 3 outputs in time divisional manner are delivered to the memory controller 31. The memory controller 31 makes reference to the memory 44 to thereby recognize respective N exposure times to deliver pixel value constituting picture image corresponding to the first exposure time) (the shortest exposure time of the N exposure times) to memory $32_1$ to store it at address corresponding to pixel of that pixel value. Similarly, the memory controller 31 respectively also delivers pixel values constituting pictures corresponding to the second exposure time to the N-th exposure time to memories $32_2$ to $32_N$ to allow those memories to store such pixel values. Thus, pixel values obtained at different exposure times with respect to pixels constituting picture of the same content are stored in the memories $32_1$ to $32_N$.

Thereafter, processing proceeds to step S22. The control section 42 allows pixels constituting picture to be remarked pixel by, e.g., raster scan order to control the read-out section 41 to thereby allow memories set at default (default memories) of memories $32_1$ to $32_N$ to read out pixel value of remarked pixel stored thereat. It is to be noted that memory caused to serve as default memory is not particularly limited, but arbitrary memory, e.g., memory $32_{N/2}$ or $32_{(N-1)/2}$, etc. of memories $32_1$ to $32_N$ may be default memory. In this example, memories that the read-out section 41 reads out pixel value of memories $32_1$ to $32_N$ will be referred to as remarked memory as occasion demands. When the read-out section 41 reads out pixel value of remarked pixel from the remarked memory in accordance with control of the control section 42, it delivers its pixel value to the buffer 21 to allow the buffer 21 to store the pixel value. Thus, processing proceeds to step S23.

At step S23, the evaluating section 23 evaluates pixel value of remarked pixel stored in the buffer 21 to output its evaluation result to the control section 42. Thus, processing proceeds to step S24.

At the step S24, the control section 42 judges on the basis of evaluation result from the evaluating section 23 whether or not pixel value of remarked pixel is in white overexposure state (and whether or not movement of remarked pixel is large as occasion demands). In the state where it is judged at the step S24 that pixel value of the remarked pixel is in white overexposure state (or in the case where it is judged that movement is large), i.e., in the case where exposure time used when pixel value which has been read out from the remarked memory is too long, processing proceeds to step S25. The control section 42 judges whether or not the remarked memory is memory in which pixel value of picture corresponding to the shortest exposure time (the first exposure time) (hereinafter referred to as shortest memory as occasion demands as occasion demands) (memory $32_1$ in this embodiment).

In the case where it is judged at the step S25 that the remarked memory is not the shortest memory, processing proceeds to step S26. The control section 42 controls the read-out section 41 to thereby change the remarked memory to memory in which pixel value of picture corresponding to exposure time shorter next is stored. Namely, in this embodiment, when the remarked memory is assumed to be memory $32_n$, the control section 42 changes the remarked memory from memory $32_n$ to memory $32_{n-1}$. Further, the control section 42 controls the read-out section 41 in a manner to read out pixel value of the remarked pixel from the changed remarked memory. Thus, processing returns to the step S23 and similar processing will be repeated at times subsequent thereto. Moreover, it is judged at the step S25 that the remarked memory is the shortest memory, i.e., in the case where even when there is employed pixel value obtained by using the shortest exposure time of N exposure times set now, there is in white overexposure state, and there is thus necessity to shorten exposure time in order to avoid while overflow state, processing proceeds to step S27. The control section 42 delivers request for allowing the entirety of N exposure times or a portion thereof (e.g., several shorter exposure times of N exposure times) to the reference parameter determining section 43. Thus, processing proceeds to step S28.

On the other hand, in the case where it is judged at the step S24 that pixel value of remarked pixel is not in the white overexposure state, processing proceeds to step S29. The control section 42 judges on the basis of evaluation result from the evaluating section unit 23 whether or not pixel value of remarked pixel is in the state of black underexposure. In the case where it is judged at the step 29 that pixel value of the remarked pixel is in the state of black underexposure, i.e., in the case where exposure time used when pixel value which has been read out from the remarked memory is obtained is too short, processing proceeds to step S30. The control section 42 judges whether or not the remarked memory is memory in which pixel value of picture corresponding to the longest exposure time (the N-th exposure time in this embodiment) (hereinafter referred to as longest memory) (memory $32_N$ in this embodiment).

In the case where it is judged at the step S30 that the remarked memory is not the longest memory, processing proceeds to step S31. The control section 42 controls the read-out section 41 to thereby change the remarked memory to memory in which pixel value of picture corresponding to exposure time longer next is stored. Namely, in this embodiment, when the remarked memory is memory $32_n$, the control section 42 changes the remarked memory from memory $32_n$ to memory $32_{n+1}$. Further, the control section 42 controls the read-out section 41 so as to read out pixel value of remarked pixel from the changed remarked memory. Thus, processing returns to the step S23, and similar processing will be repeated at times subsequent thereto. Moreover, in the case where it is judged at the step S30 that the remarked memory is the longest memory, i.e., in the case where even when there is employed pixel value obtained by using the longest exposure time of N exposure times set now, there is in the state of black underexposure, and there is thus necessity to allow the exposure time to be longer in order to avoid the state of black underexposure, processing proceeds to step S32. The control section 42 delivers a request for allowing the entirety of N exposure times or a portion thereof(e.g., several longer exposure times of N exposure times) to be longer to the reference parameter determining section 43. Thus, processing proceeds to step S28.

On the other hand, in the case where it is judged at the step S29 that pixel value of remarked pixel is not in the state of black underexposure, i.e., in the case where pixel value of the remarked pixel is not in either state of white overexposure and black underexposure, processing proceeds to the step S28. Thus, pixel value of remarked pixel stored in the buffer 21 is delivered to the pixel value correcting section 22. Moreover, at the step S28, the control section 42 recognizes exposure time when pixel value stored in the buffer 21 is obtained by making reference to memory 44 to deliver its exposure time to the pixel value correcting section 22. Further, at the step S28, the pixel value correcting section 22 allows pixel value of the remarked pixel from the buffer 21 and exposure time used for obtaining that pixel value from the control section 42 to correspond to each other to deliver the pixel value and the exposure time to the memory 6 to allow the memory 6 to store them. Accordingly, at the step S28, at the pixel value correcting section 22, in principle, pixel values which are not in either state of white overexposure and black underexposure of plural pixel values stored in memories $32_1$ to $32_N$ with respect to remarked pixel are selected and are stored into the memory 6. It is to be noted that in the case where there does not exist pixel value placed in the state of white overexposure or black underexposure of plural pixel values stored in memories $32_1$ to $32_N$ with respect to the remarked pixel, pixel value in which the degree of the state of white overexposure or black underexposure is the lowest is selected and is stored into the memory 6, and a request for change of exposure time is made from the control section 42 to the reference parameter determining section 43 in order to cancel the state of that white overexposure or black underexposure.

After pixel value and exposure time of remarked pixel is caused to be stored into the memory 6, processing proceeds to step S33, at which whether or not all of pixel values constituting picture of one frame are written into the memory 6 is judged. In the case where it is judged at the step S33 that all of pixel values constituting picture of one frame are not yet written into the memory 6, processing proceeds to step S34. Pixel next to remarked pixel now in order of raster scan is caused to be newly remarked pixel. At the read-out section 41, pixel value of that remarked pixel is read out from the remarked memory. Further, processing returns to the step S23, and similar operation will be repeated at times subsequent thereto. Moreover, in the case where it is judged at the step S33 that all of pixels constituting one frame are written into the memory 6, i.e., in the case where pixel values of all pixels constituting one frame and exposure times caused to correspond thereto are stored, processing proceeds to step S35. Thus, the pixel value collecting section 22 reads out respective pixel values from the memory 6 similarly to the case at the step S8 of FIG. 7 to correct respective pixel values on the basis of exposure times caused to correspond to those pixel values to output picture data of one frame constituted with the corrected pixel value.

Further, processing proceeds to step S36. The reference parameter determining section 43 is operative so that in the case where there is request for allowing exposure time to be shorter or longer of exposure time at step S27 or S32, it determines reference parameter for a second time so that exposure time in accordance with that request is set. Further, the reference parameter determining section 43 sets N exposure times for a second time on the basis of the reference parameter which has been determined for a second time. Thus, processing proceeds to step S37. It is to be noted that in the case where there is no request for allowing exposure time to be shorter or longer, the reference parameter determining section 43 sets the same N exposure times as those at previous time by using the reference parameter determined last as it is.

At the step S37, the reference parameter determining section 43 delivers N exposure times set at the step S36 to memory 44 to allow the memory to store them. Thus, processing returns to the step S22, and similar processing will be repeated with respect to the next frame at times subsequent thereto.

As stated above, such an approach is employed to set plural exposure times to obtain picture images corresponding to respective plural exposure times to select pixel values which are not placed in the state of white overexposure and black underexposure to thereby constitute picture images of respective frames. Accordingly, even when there is employed object of high contrast, it is possible to obtain picture of which detail is not injured. Further, also in this case, similarly to the case in FIG. 2 and FIG. 3, it is possible to provide the same effect as in the case where dynamic range of CCD 3 (or A/D converter 4) is broadened.

It is to be noted that, also in the embodiment of FIG. 11, respective pixel values stored in the memory 6 may be outputted along with exposure times caused to correspond to those pixel values as they are and may be recorded onto recording medium 103 or may be caused to undergo transmission through the transmission medium 104.

While, in the above-described case, at the pixel value correcting section 22, correction of pixel value by exposure time is carried out on the premise that exposure time and pixel value have proportional relationship, in the case where exposure time and pixel value have not proportional relationship, there is included in corrected pixel value obtained as the result of correction of pixel value with the proportional relationship being as the premise.

Figure 14:
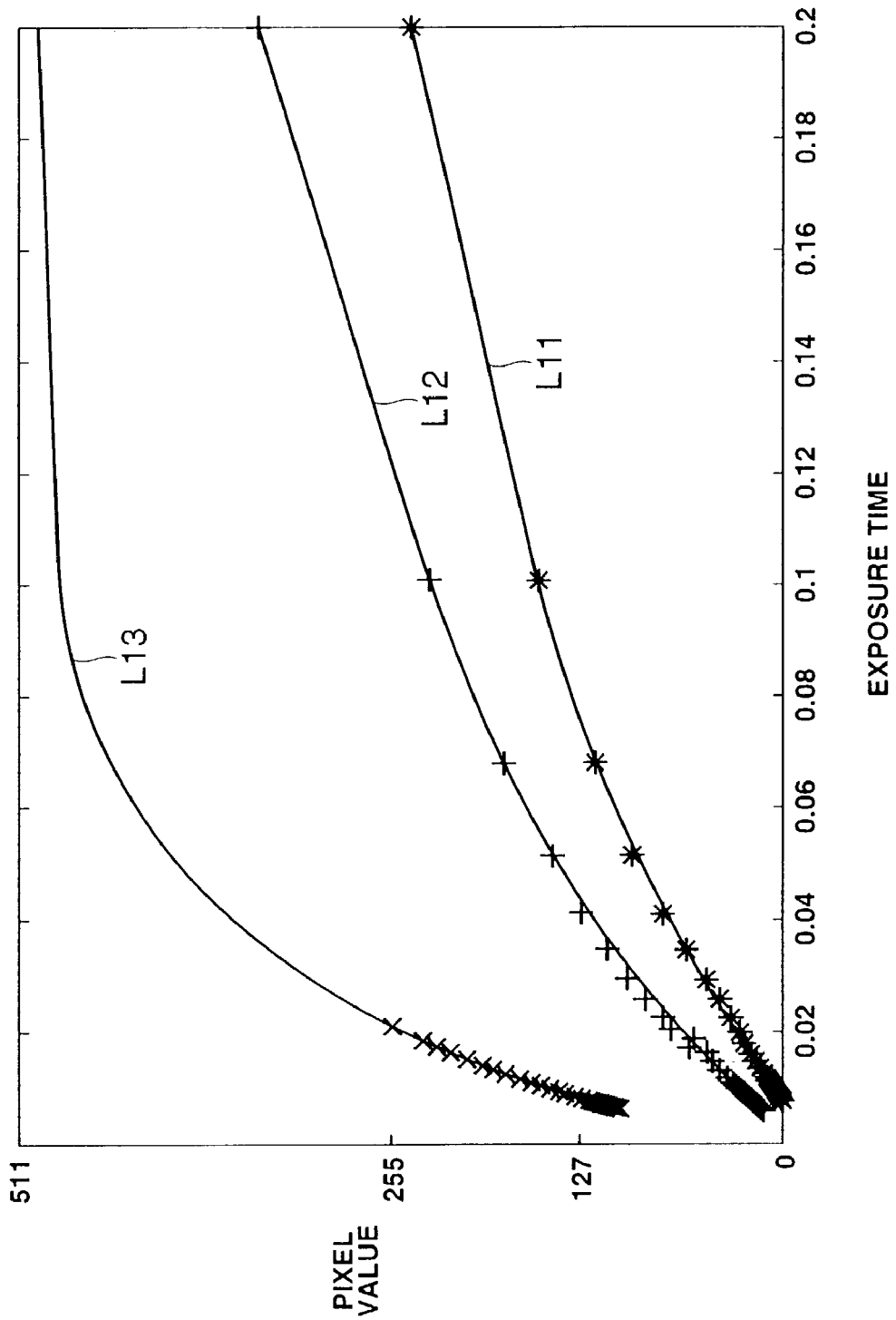
FIG. 14 is a view showing the relationship between pixel value and exposure time.

In view of the above, the pixel value correcting section 22 may estimate the relationship between exposure time and pixel value to carry out correction of pixel value by exposure time on the basis of the estimation result. Namely, in tile case where, e.g., output of A/D converter 4 is 8 bits, the pixel value correcting section 22 varies exposure time as shown in FIG. 14 with respect to several brightnesses to obtain pixel value in the range of 0 to 255 (=$2^8$−1). In FIG. 14, mark x indicates pixel values obtained with respect to respective exposure times. Further, the pixel value connecting section 22 determines approximate curve which approximates the relationship between exposure time and pixel value every respective brightnesses by using pixel values by respective exposure tines obtained with respect to respective brightnesses. In the embodiment of FIG. 14, approximate curves L11, L12, L13 indicating the relationship between exposure time and pixel value with respect to three brightnesses are obtained. Further, the pixel value correcting section 22 carries out correction of pixel value by exposure time on the basis of the approximate curves thus obtained.

Figure 15:
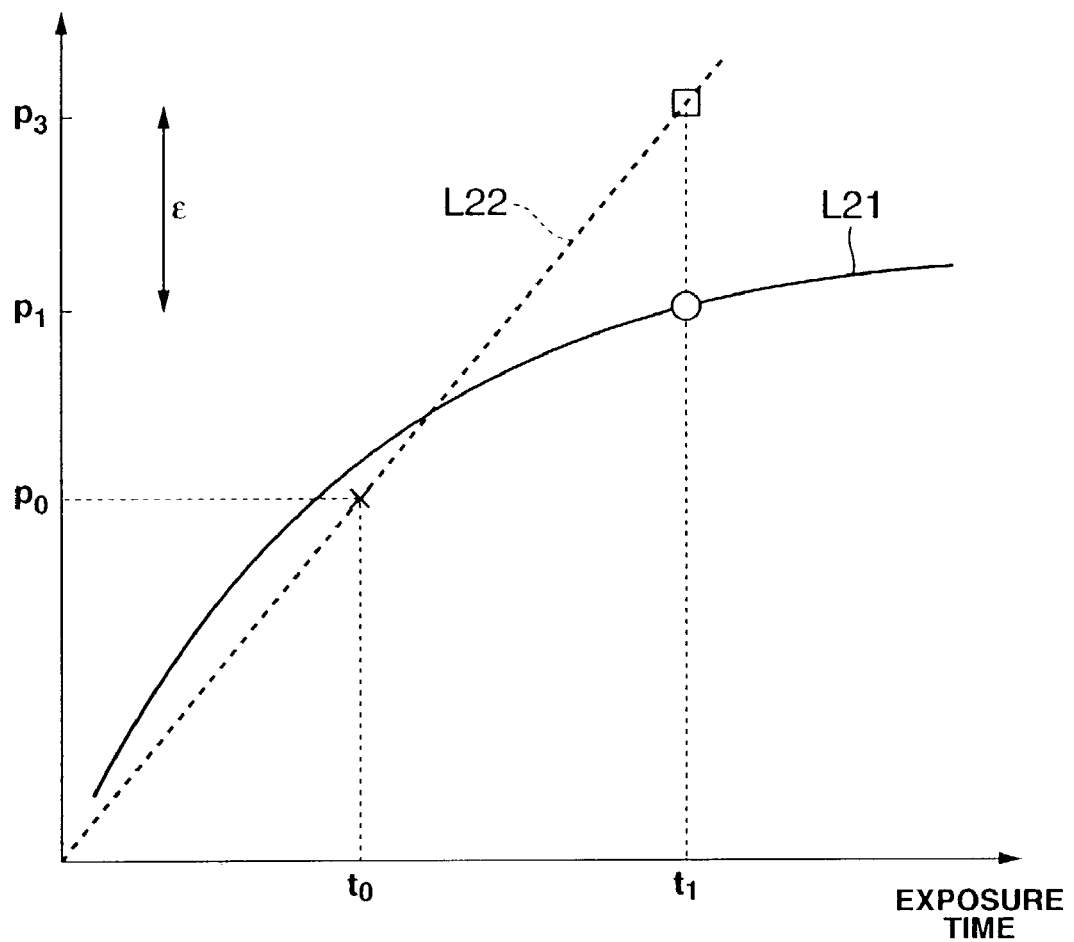
FIG. 15 is a view for explaining correction of pixel value using approximate curve which approximates the relationship between pixel value and exposure time.

Namely, as shown in FIG. 15, the pixel value correcting section 22 determines approximate curve closest to the point ($p_0$, $t_0$) (indicated by mark x in FIG. 15) prescribed by pixel value $p_0$ to be corrected and exposure time $t_0$ with respect to that pixel value. In the embodiment of FIG. 15, approximate curve L21 is curve closest to the point ($p_0$, $t_0$). Further, in the case where pixel value $p_0$ with respect to exposure time $t_0$ is corrected to pixel value with respect to exposure time $t_1$, the pixel value correcting section 22 determines the point corresponding to exposure time $t_1$ (indicated by mark ○ in FIG. 15) on the approximate curve L21 to allow pixel value $p_1$ indicated by that point to be corrected pixel value. In this case, corrected pixel value having good accuracy can be obtained.

Namely, in the case where exposure time and pixel value have not proportional relationship, but has non-linear relationship as indicated by approximate curve L21 of FIG. 15, for example, when correction of pixel value $p_0$ is carried out with the proportional relationship between exposure time and pixel value being as the premise, pixel value $p_0$ is corrected to pixel value $p_3$ indicated by the point corresponding to exposure time $t_1$ (indicated by mark □ in FIG. 15) on the straight line L22 passing through the origin. As a result, error $\epsilon(=p_3-p_1)$ is produced. On the contrary, in the case where approximate curve is used to carry out correction of pixel value, such an error does not take place.

Figure 13:
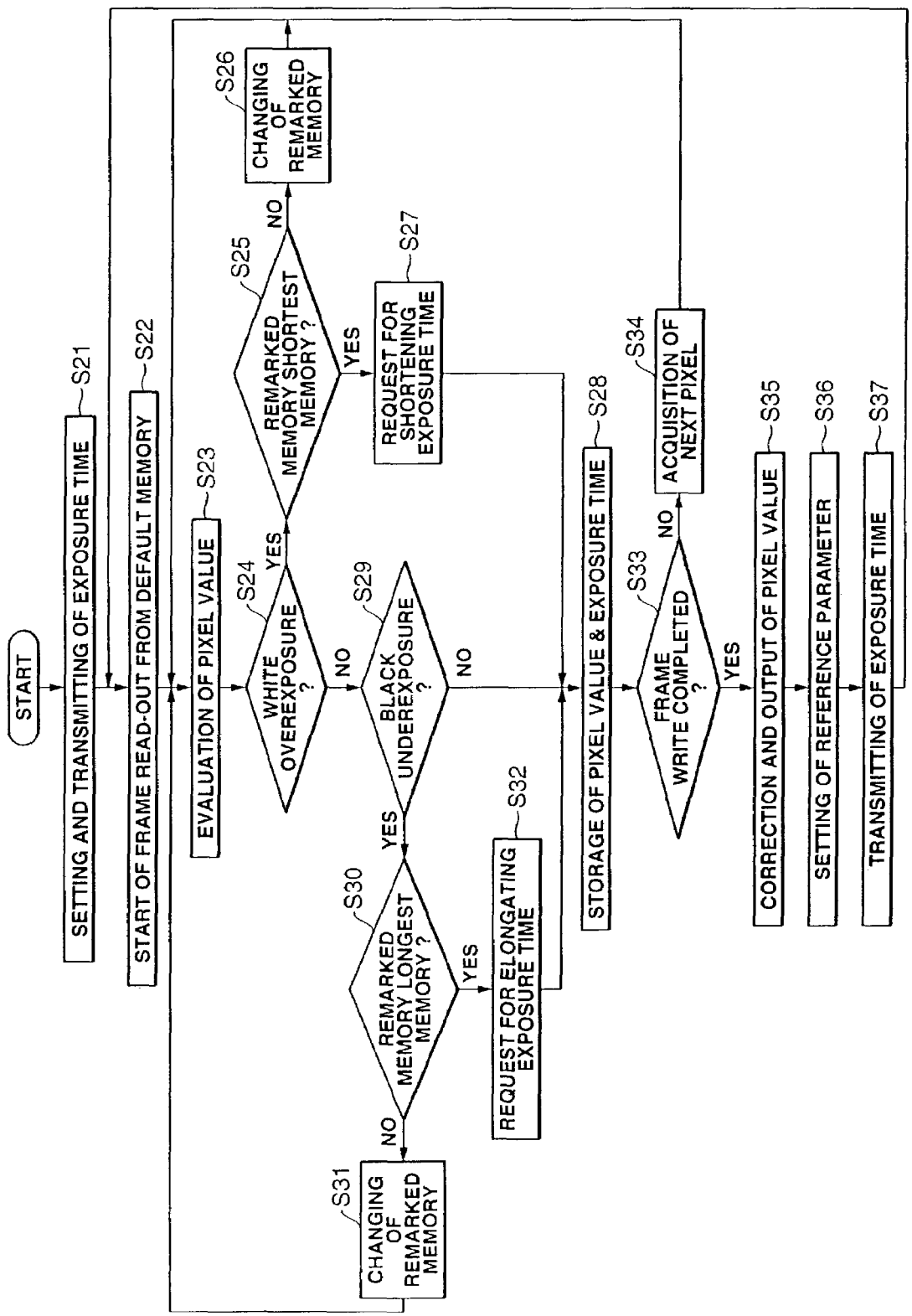
FIG. 13 is a flowchart for explaining operation of digital video camera 101 of FIG. 11.

Meanwhile, in accordance with the processing by the flowchart of FIG. 13, when pixel value which is not placed in either state of white overexposure and black underexposure of plural pixel values of remarked pixels obtained with respect to respective N exposure times stored in N memories $32_1$ to $32_N$ is first found, the pixel value correcting section 22 selects, as pixel value of remarked pixel, the pixel value which has been first found to allow the memory 6 to store that pixel value.

However, the pixel value correcting section 22 may be adapted to select, as pixel value of remarked pixel, pixel value close to a reference pixel value in the state where, e.g., a certain pixel value is caused to be the reference pixel value. Namely, in general, it is considered that sensitivity of the CCD 3 is the highest at value of intermediate degree of the range of pixel value that the A/D converter 4 outputs. In view of the above, reference pixel value is caused to be value of intermediate degree of the range of pixel value that the A/D converter 4 outputs, and the pixel value correcting section 22 may be adapted to select, as pixel value of remarked pixel, pixel value closest to reference pixel value of N pixel values of remarked pixel stored in respective memories $32_1$ to $32_N$.

Figure 16:
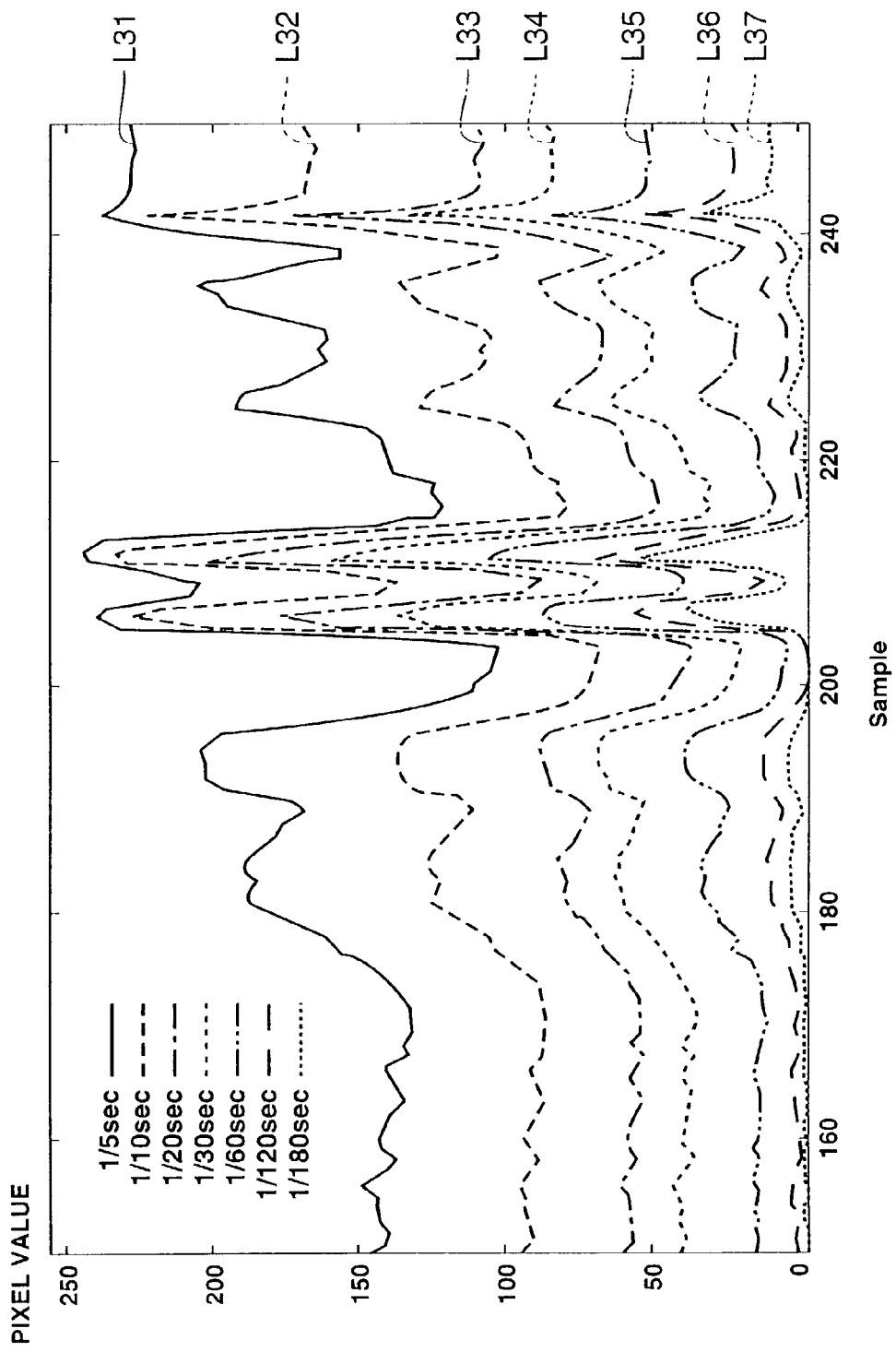
FIG. 16 is a view showing pixel values obtained by plural exposure times.

In accordance with pixel value selected in this way, picture image as described below is constructed. Namely, FIG. 16 shows pixel value on a certain horizontal line of picture image obtained by using plural exposure times with respect to a certain object. In the embodiment of FIG. 16, as plural exposure times, there are used seven exposure times of 1/5, 1/10, 1/20, 1/30, 1/60, 1/120, 1/180 sec. In addition, in FIG. 16, curves L31, L32, L33, L34, L35, L36, L37 indicate pixel values (outputs of A/D converter 4) obtained by respective exposure times of 1/5, 1/10, 1/20, 1/30, 1/60, 1/120, 1/180 sec.

Figure 17:
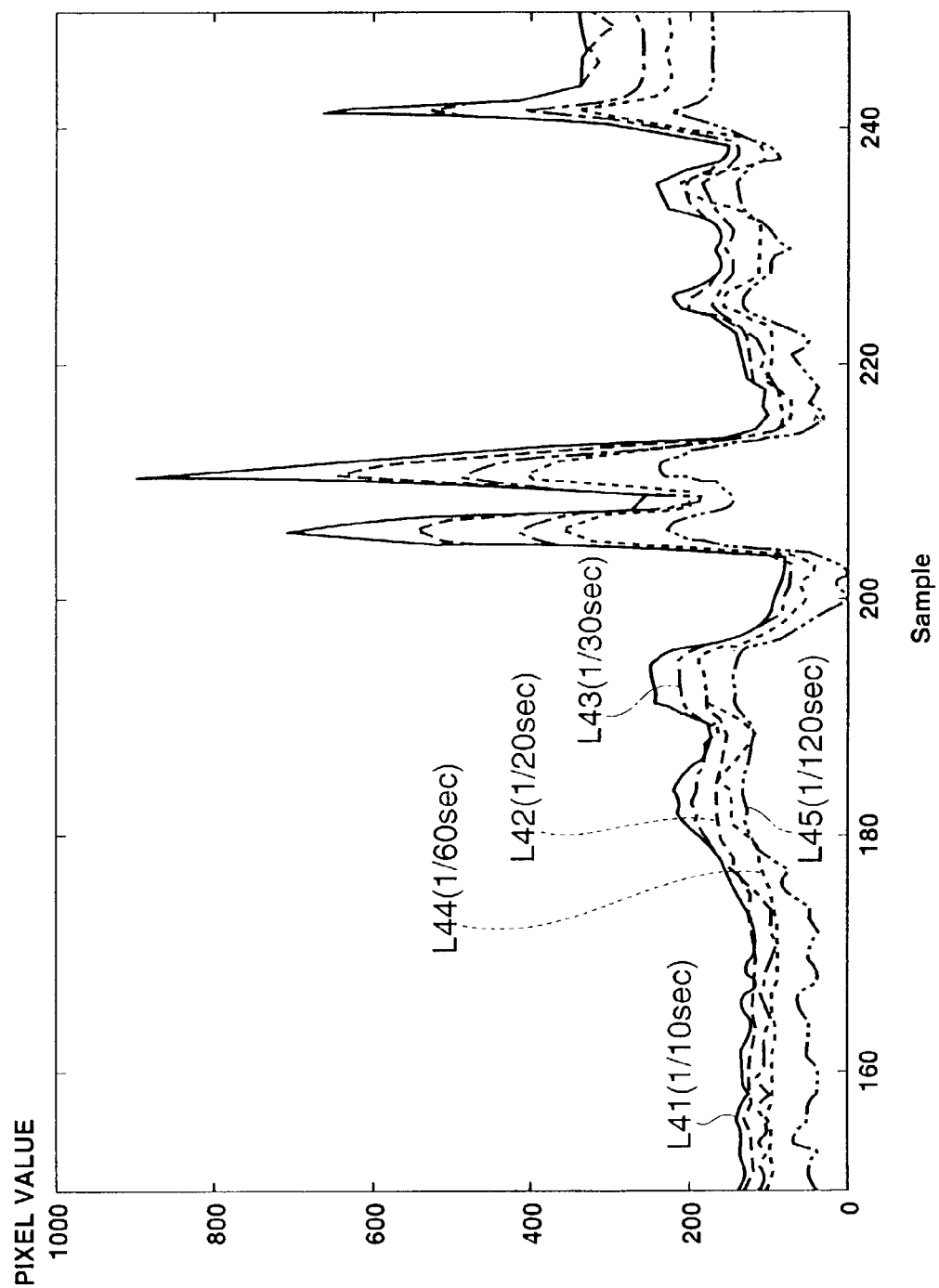
FIG. 17 is a view showing corrected pixel value.

FIG. 17 shows corrected pixel value obtained by correcting pixel value of FIG. 16 by exposure time. It is assumed in the embodiment of FIG. 17 that pixel value and exposure time have proportional relationship, and 1/10 sec. is caused to be exposure time of reference and corrected pixel value is determined by multiplying pixel value where exposure time is 1/S [sec.] by S/10. Moreover, in the embodiment of FIG. 17, there are shown corrected pixel values with respect to five exposure times where exposure times are 1/10, 1/20, 1/30, 1/60, 1/120, and curves L41, L42, L43, L44, L45 show corrected pixel values of pixel values obtained by respective exposure times of 1/10, 1/20, 1/30, 1/60, 1/120 sec.

Since pixel value of FIG. 16 is output of A/D converter, dynamic range of 8 bits is obtained, whereas since pixel value of FIG. 17 is corrected pixel value, dynamic range greater than 8 bits is obtained.

Figure 18:
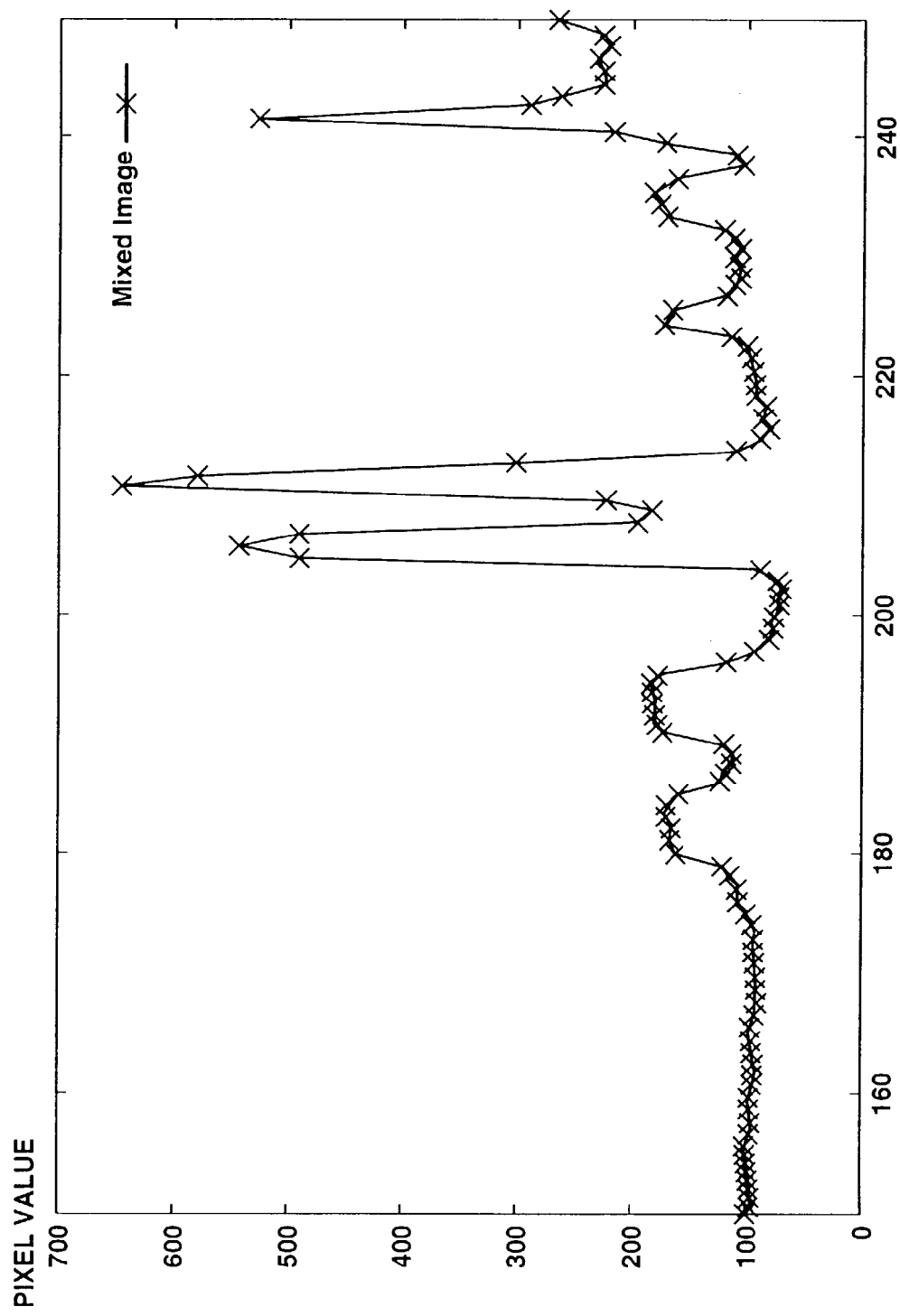
FIG. 18 is a view showing picture image constituted with corrected pixel value obtained by correcting pixel value closest to reference pixel value.

FIG. 18 shows picture image constituted by selecting collected pixel value of pixel value closest to the reference pixel value. In the embodiment of FIG. 18, 100 is used as reference pixel value. Accordingly, when pixel value obtained by exposure time T is assumed as $P_T$ and collected pixel value obtained by correcting pixel value $P_T$ is assumed as $f(P_T)$, picture image of FIG. 18 is constituted by, e.g., corrected pixel value P obtained by the formula $P=f(\min(P_T-P_B)^2)$. In the above formula, $\min(P_T-P_B)^2$ represents $P_T$ which minimizes $(P_T-P_B)^2$. In addition, $P_B$ represents reference pixel value and is equal to 100 in this case as described above.

By making comparison between FIG. 16 and FIG. 18, in the case where output of the A/D converter 4 is used as it is, only picture image (FIG. 16) in the range where pixel value is 0 to 255 can be obtained. On the other hand, in the case by the corrected pixel value, picture image by pixel value in broader range (about 0 to 700 in FIG. 18), i.e., picture image having broad dynamic range can be obtained.

The above-described series of processing may be carried out by handware, or may be carried out by software. In the case where a series of processing are carried out by software, program constituting that software is installed into widely used computer, etc.

Figure 19:
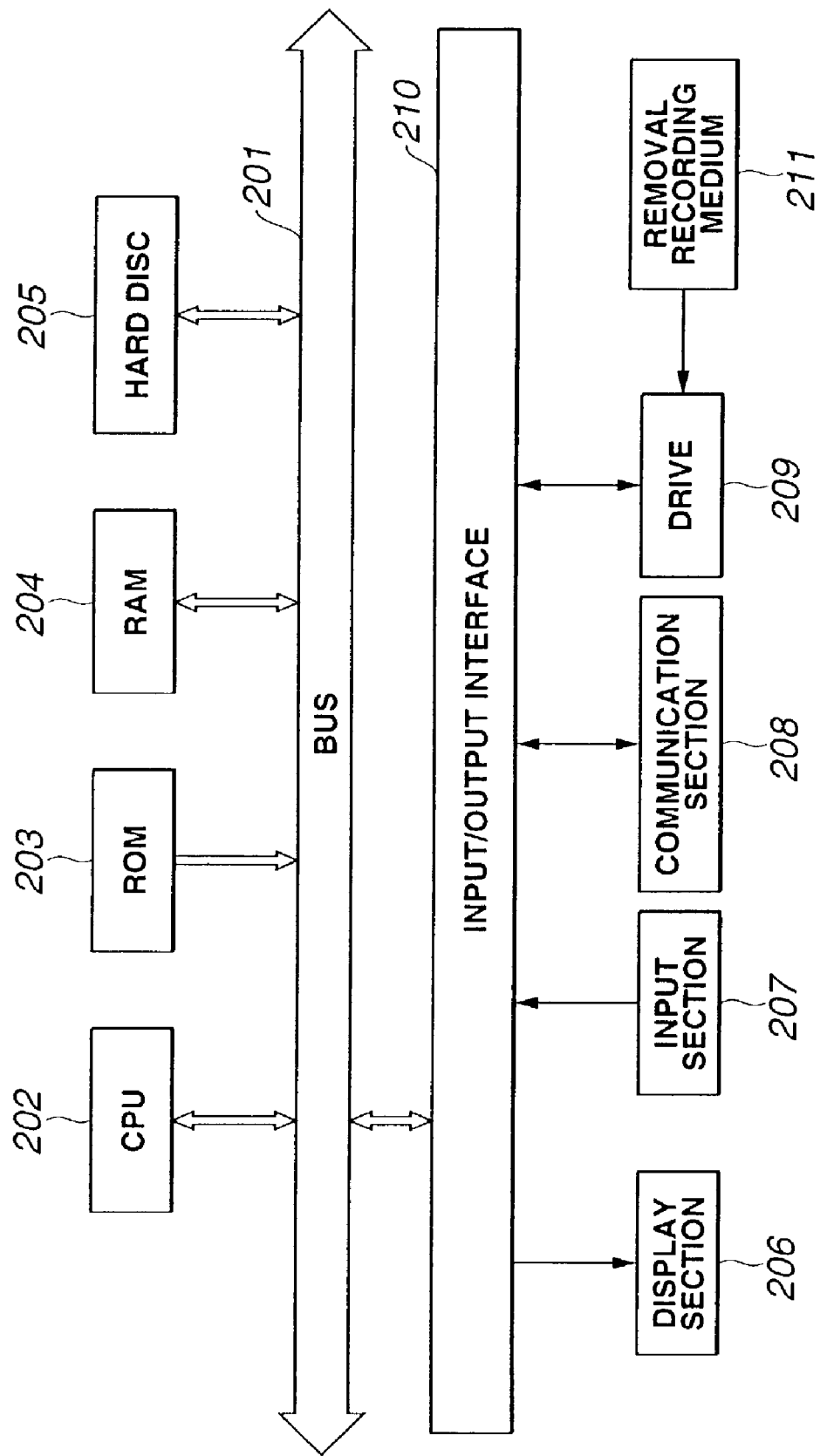
FIG. 19 is a block diagram showing an example of configuration of an embodiment of a computer to which this invention is applied.

FIG. 19 shows an example of the configuration of an embodiment of computer into which program which executes the above-described series of processing is installed. Program can be recorded in advance with respect to a hard disc 205 or a ROM 203 as recording medium included within the computer. Alternatively, program may be temporarily or permernently stored (recorded) on a removable recording medium 211 such as floppy disc, CD-ROM (Compact Disc Read Only Memory), MO (Magneto optical) disc, DVD (Digital Versatile Disc), magnetic disc, or semiconductor memory, etc. Such removable recording medium 211 can be provided as the so-called package software. In this case, program is installed from the removable recording medium 211 as described above into the computer. In addition, program may be transferred by wireless to the computer through artificial satellite for digital satellite broadcast from down load site, or may be transferred to the computer by wire through network such as LAN (Local Area Network) or internet. In the computer, program transferred in such a way may be received at a communication section 208 and installed into hard disc 205 included.

The computer includes a CPU (Central Processing Unit) 202. An input/output interface 210 is connected to the CPU 202 through a bus 201. When command is inputted as the result of the fact that an input section 207 comprised of keyboard, mouse or microphone, etc. is operated or is caused to undergo similar operation by user through an input/output interface 210, the CPU 202 executes program stored in a ROM (Read Only Memory) 203 in accordance with the command. Alternatively, the CPU 202 loads, into a RAM (Random Access Memory) 204, program stored on the hard disc 205, program transferred from the satellite or the network, received at the communication section 208 and installed on the hard disc 205, or program read out from the removable recording medium 211 fitted at a drive 209 and installed on the hard disc 205, and executes such program. Thus, the CPU 202 carries out processing in accordance with the above-described flowchart, or processing carried out by the configuration of the above-described block diagrams. In addition, the CPU 202 outputs, e.g., as occasion demands its processing result from an output section constituted with LCD (Liquid Crystal Display) or speaker, etc. through the input/output interface 210, transmits it from the communication section 208 and records it onto the hard disc 205, etc.

It is to be noted that, in this specification, it is not necessarily required to process processing steps which describe program for allowing the computer to carry out various processing in a time divisional manner along the order described as the flowchart, and such processing steps include processing executed in parallel or individually (e.g., parallel processing or processing by object). Moreover, program may be processed by single computer, or may be caused to undergo distribution processing by plural computers. Further, program may be transferred to remote computer, at which it is executed.

It is to be noted that while shutter capable of controlling exposure every respective pixels of CCD 3 is used as shutter 2 in the embodiments of FIGS. 2 to 4, there may be used, e.g., shutter capable of controlling exposure every plural pixels such as two pixels of CCD 3 in addition to the above as shutter 2. Further, this invention can be applied to both moving picture and still picture.

Furthermore, while, in this embodiment, particularly reference has not been made to stop (iris), such an approach may be also employed to carry out control of stop on the basis of evaluation result of pixel value. Namely, in the case where there is the state of black underexposure or white over exposure, such an approach may be employed to carry out control so as to open stop or close stop. In addition, a user may manually adjust stop.

INDUSTRIAL APPLICABILITY

In accordance with the first image pick-up apparatus and the first image pick-up method, and the program and the program recording medium of this invention, pixel values acquired from image pick-up means having light receiving surface for receiving light from object to carry out photo-electric conversion and adapted to output pixel value obtained as the result of the photo-electric conversion are evaluated, and exposure time with respect to light receiving surface is controlled in pixel units on the basis of the evaluation result. Accordingly, also with respect to object of high contrast, it is possible to obtain picture image of which detail is not injured.

In accordance with the data structure and the data recording medium of this invention, plural pixel values that the image pick-up apparatus for picking up image of object outputs and exposure times every respective pixel values used in the image pickup apparatus for obtaining respective plural pixel values are caused to correspond to each other. Accordingly, pixel values are corrected on the basis of exposure time, thereby making it possible to obtain picture image in which constant exposure is used with respect to the entirety and having broad dynamic range.

In accordance with the image pick-up control apparatus of this invention, pixel values are evaluated and control signal for controlling, in predetermined surface units, exposure time with respect to light receiving surface is outputted to the image pick-up unit on the basis of the evaluation result. Accordingly, also with respect to object of high contrast, it is possible to obtain picture image of which detail is not injured.

In accordance with the second image pick-up apparatus and the second image pick-tip method of this invention, plural exposure times with respect to light receiving surface at image pick-up means having light receiving surface for receiving light from object to carry out photo-electric conversion and adapted to output pixel value obtained as the result of the photo-electric conversion are controlled, and one pixel value is selected from pixel values corresponding to respective plural exposure times of respective pixel positions which are obtained by picking up image of object by plural exposure times on the basis of that control. Accordingly, also with respect to object of high contrast, it is possible to obtain picture image of which detail is not injured.

In accordance with the second program and the second program recording medium of this invention, pixel values corresponding to respective plural exposure times of respective pixel positions which are obtained by controlling plural exposure times with respect to light receiving surface at the image pick-up unit having light receiving surface for receiving light from object to carry out photo-electric conversion and adapted to output pixel value obtained as the result of the photo-electric conversion are evaluated, and one pixel value is selected from pixel values corresponding to respective plural exposure times on the basis of the evaluation result. Accordingly, also with respect to object of high contrast, it is possible to obtain picture image of which detail is not injured.

The invention claimed is:

1. An image pick-up apparatus for picking up an image of an object, the image pick-up apparatus comprising:
   an image pick-up unit having a light receiving surface configured to receive light from the object to carry out photo-electric conversion, and adapted to output a pixel value obtained as the result of the photo-electric conversion;
   an evaluator configured to evaluate the pixel value;
   a controller configured to control, in pixel units, exposure time with respect to the light receiving surface on the basis of the evaluation by the evaluator;
   a storage unit configured to store plural pixel values output from the image pick-up unit and the exposure times of pixels corresponding to the plural pixel values, the plural pixel values included in a frame or a field, and an exposure time of a particular pixel may be different than an exposure time of another pixel; and
   a correcting unit configured to correct the plural pixel values stored in the storage unit based on the exposure times stored in the storage unit,
   wherein the controller is operative so that when the pixel value is a first predetermined value or more, the controller shortens the exposure time with respect to the pixel of the light receiving surface corresponding to that pixel value, and
   wherein the controller is operative so that when the pixel value is less than a second predetermined value, the controller elongates the exposure time with respect to the pixel of the light receiving surface corresponding to that pixel value.

2. The image pick-up apparatus as set forth in claim 1,
   wherein the evaluator evaluates whether or not the pixel value is a value within a predetermined range; and
   wherein when the pixel value is not a value within the predetermined range, the controller controls the exposure time with respect to the pixel of the light receiving surface corresponding to that pixel value so that the pixel value is caused to be within the predetermined range.

3. The image pick-up apparatus as set forth in claim 1,
   wherein the correcting unit is operative so that when the longest time of the plural exposure times stored in the storage unit is assumed to be $1/S_{BASE}$ and the exposure time of the pixel value stored in the storage unit is assumed to be 1/S, the correcting unit multiplies the pixel value stored in the storage unit by $S/S_{BASE}$ to thereby correct the pixel value.

4. The image pick-up apparatus as set forth in claim 1, which further comprises a display control section for displaying on a display section a picture image in accordance with pixel values corrected at the correcting unit.

5. An image pick-up method of picking up an image of an object, the image pick-up method comprising:
   an evaluation step for evaluating a pixel value acquired from an image pick-up section having a light receiving surface for receiving light from the object to carry out photo-electric conversion and adapted to output the pixel value obtained as the result of the photo-electric conversion;
   a control step for controlling, in pixel units, exposure time with respect to the light receiving surface on the basis of the evaluation result by the evaluation step;
   a storage step for storing plural pixel values output from the image pick-up section and the exposure times of pixels corresponding to the plural pixel values, the plural pixel values included in a frame or a field, and an exposure time of a particular pixel may be different than an exposure time of another pixel;
   a correcting step for correcting the stored plural pixel values based on the stored exposure times; and
   a changing step of shortening the exposure time with respect to the pixel of the light receiving surface corresponding to that pixel value when the pixel value is a first predetermined value or more, or elongating the exposure time with respect to the pixel of the light receiving surface corresponding to that pixel value when the pixel value is less than a second predetermined value.

6. A program embodied in a computer-readable medium to control a computer to perform image pick-up processing for picking up an image of an object, the program including:
   an evaluation step for evaluating a pixel value acquired from an image pick-up section having a light receiving surface for receiving light from the object to carry out photo-electric conversion and adapted to output the pixel value obtained as the result of the photo-electric conversion;
   a control step for controlling, in pixel units, exposure time with respect to the light receiving surface on the basis of the evaluation result by the evaluation step;
   a storage step for storing plural pixel values output from the image pick-up section and the exposure times of pixels corresponding to the plural pixel values, the plural pixel values included in a frame or a field, and an exposure time of a particular pixel may be different than an exposure time of another pixel;
   a correcting step for correcting the stored plural pixel values based on the stored exposure times; and
   a changing step of shortening the exposure time with respect to the pixel of the light receiving surface corresponding to that pixel value when the pixel value is a first predetermined value or more, or elongating the exposure time with respect to the pixel of the light receiving surface corresponding to that pixel value when the pixel value is less than a second predetermined value.

7. A computer-readable medium storing a program for allowing a computer to carry out image pick-up processing which picks up an image of an object, said program causing said computer to perform:
   an evaluation step for evaluating a pixel value acquired from an image pick-up section having a light receiving surface for receiving light from the object and adapted to output pixel value obtained as the result of the photo-electric conversion;
   a control step for controlling, in pixel units, exposure time with respect to the light receiving surface on the basis of the evaluation result by the evaluation step;
   a storage step for storing plural pixel values output from the image pick-up section and the exposure times of pixels corresponding to the plural pixel values, the plural pixel values included in a frame or a field, and an exposure time of a particular pixel may be different than an exposure time of another pixel;
   a correcting step for correcting the stored plural pixel values based on the stored exposure times; and
   a changing step of shortening the exposure time with respect to the pixel of the light receiving surface corresponding to that pixel value when the pixel value is a first predetermined value or more, or elongating the exposure time with respect to the pixel of the light receiving surface corresponding to that pixel value when the pixel value is less than a second predetermined value.

8. An image pick-up control apparatus for controlling an image pick-up section having a light receiving surface for receiving light from an object and adapted to output pixel values obtained as the result of the photo-electric conversion, the image pick-up control apparatus comprising:
   an evaluating section for evaluating the pixel value;
   a controller for outputting, to the image pick-up section, a control signal for controlling, in a predetermined surface unit, an exposure time with respect to the light receiving surface on the basis of evaluation result by the evaluating section;
   a storage unit configured to store plural pixel values output from the image pick-up section and the exposure times of pixels corresponding to the plural pixel values, the plural pixel values included in a frame or a field, and an exposure time of a particular pixel may be different than an exposure time of another pixel; and
   a correcting unit configured to correct the plural pixel values stored in the storage unit based on the exposure times stored in the storage unit,
   wherein the controller is operative so that when the pixel value is a first predetermined value or more, the controller shortens the exposure time with respect to the pixel of the light receiving surface corresponding to that pixel value, and
   wherein the controller is operative so that when the pixel value is less than a second predetermined value, the controller elongates the exposure time with respect to the pixel of the light receiving surface corresponding to that pixel value.

* * * * *